United States Patent
Roop et al.

(10) Patent No.: US 11,637,428 B2
(45) Date of Patent: Apr. 25, 2023

(54) SELECTIVE POWER OSCILLATION DAMPING CONTROL SYSTEM WITH DAMPING RATIO DYNAMIC GAIN AND METHOD FOR THE SAME

(71) Applicant: Mitsubishi Electric Power Products, Inc., Warrendale, PA (US)

(72) Inventors: David Edward Roop, Cranberry Township, PA (US); Samantha Ann Morello, Cranberry Township, PA (US); Tamojit Chakraborty, Cranberry Township, PA (US)

(73) Assignee: Mitsubishi Electric Power Products, Inc., Warrendale, PA (US)

( * ) Notice: Subject to any disclaimer, the term of this patent is extended or adjusted under 35 U.S.C. 154(b) by 218 days.

(21) Appl. No.: 17/036,638

(22) Filed: Sep. 29, 2020

(65) Prior Publication Data

US 2022/0102976 A1  Mar. 31, 2022

(51) Int. Cl.
*H02J 3/24* (2006.01)
*H02J 13/00* (2006.01)
*G05B 19/042* (2006.01)

(52) U.S. Cl.
CPC .............. *H02J 3/24* (2013.01); *G05B 19/042* (2013.01); *H02J 13/00002* (2020.01); *G05B 2219/2639* (2013.01); *H02J 2203/10* (2020.01)

(58) Field of Classification Search
CPC .... H02J 3/24; H02J 13/00002; H02J 2203/10; H02J 3/1842; G05B 19/042; G05B 2219/2639; G05B 19/05; Y02E 40/20
See application file for complete search history.

(56) References Cited

U.S. PATENT DOCUMENTS

| | | | |
|---|---|---|---|
| 2011/0118887 A1* | 5/2011 | Oi | G05B 5/01 700/293 |
| 2011/0130110 A1* | 6/2011 | Aida | H04L 25/0292 455/343.1 |
| 2012/0200166 A1* | 8/2012 | Berggren | H02J 3/242 307/102 |
| 2013/0167652 A1* | 7/2013 | Pflum | G01F 1/115 73/861 |
| 2013/0175871 A1* | 7/2013 | Knuppel | H02P 9/02 307/102 |
| 2014/0354062 A1* | 12/2014 | Chaudhuri | H02J 3/241 307/102 |
| 2014/0361537 A1* | 12/2014 | Andresen | H02J 3/241 290/44 |
| 2015/0381089 A1* | 12/2015 | Tarnowski | H02J 3/24 290/44 |
| 2018/0138709 A1* | 5/2018 | Hamann | F03D 7/0296 |

* cited by examiner

*Primary Examiner* — Mohammad Ali
*Assistant Examiner* — Dhruvkumar Patel
(74) *Attorney, Agent, or Firm* — Posz Law Group, PLC

(57) ABSTRACT

A system and method to selectively pass and damp oscillations in an electric power grid via a controller of a power electronic device irrespective of the modes of the power oscillations. The system and method includes multiple limiters having dynamic limits that are openable and closeable to control the response of the controller, damping ratio dynamic gain control logic that determines a dynamic gain for a control signal based on the oscillation characteristics of one or more input signals, and pulse counter logic to selectively control at least one of the limiters based on the pulse count of the control signal.

21 Claims, 13 Drawing Sheets

SELECTIVE POWER OSCILLATION DAMPING CONTROL SYSTEM WITH DAMPING RATIO DYNAMIC GAIN AND METHOD FOR THE SAME

TECHNICAL FIELD

The subject matter described below relates generally to a utility power oscillation damping system and method for the same. More particularly, the described subject matter relates to a system and method for dynamically, and selectively, damping utility power oscillations irrespective of the modes and characteristics of the power oscillations.

BACKGROUND

In utility power grids, power oscillations often occur for numerous reasons. Uncontrolled oscillations in the utility power grid can cause problems such as blackouts, brownouts, power surges, and general reduction in power output provided by the utility grid.

While some types of power oscillation control exist, the existing power oscillation control is typically designed for specific modes and characteristics of oscillation and power systems. In other words, typical power oscillation control cannot compensate for unexpected oscillations as these systems are designed for only predetermined modes and characteristics of oscillations. Because of this, these types of systems experience challenges when the mode of oscillations change in terms of phase or magnitude.

In addition, the existing power oscillation control systems are unable to determine when the power oscillations will self-correct. That is, these types of systems will not take into account the damping ratio of the oscillations to the extent that they can selectively decide the degree in which to damp a power oscillation. Consequently, these types of systems may exacerbate the power oscillations instead of damping the power oscillations by performing unnecessary control.

Furthermore, existing power oscillation damper control systems may include security flaws that will not recognize when a power control signal may overwhelm the utility grid, a power generator, or associated electronic device.

In view of these problems, it would therefore be desirable to provide a power oscillation damping system and method with improved sensitivity, selectivity, and security compared with other systems and methods.

SUMMARY

Accordingly, one or more embodiments includes a power oscillation damping system for an electric power grid. The power oscillation damping system also includes a power electronic device configured to generate active power or reactive power, or regulate the electric power grid. The system also includes a controller configured to selectively pass and damp oscillations of one or more input signals from the electric power grid, the controller being coupled to memory and being configured to: generate a power oscillation damper (POD) control signal based on the one or more input signals; determine a dynamic gain based on an amplitude of the oscillations, a duration of the oscillations, and a rate of damping of the oscillations in the one or more input signals; apply the dynamic gain to the POD control signal to modify the amplitude of the POD control signal; input the POD control signal having the dynamic gain into an output signal limiter having dynamic limits that are openable and closeable, the dynamic limits defining a maximum output of the controller; count, via a counter, each pulse in the POD control signal with respect to time, the pulse being a rising edge of the POD control signal that deviates in a positive direction or a negative direction from zero; selectively open and close the dynamic limits of the output signal limiter based on a pulse count with respect to time. The system also includes output the POD control signal in response to the output signal limiter being opened.

One or more embodiments includes a computer-implemented method to selectively pass and damp oscillations in an electric power grid via a power electronic device. The computer-implemented method also includes generating, via a controller, a power oscillation damper control signal based on one or more input signals from the electric power grid. The method also includes determining a dynamic gain based on an amplitude of the oscillations, a duration of the oscillations, and a rate of damping of the oscillations in the one or more input signals. The method also includes applying the dynamic gain to the POD control signal to modify the amplitude of the POD control signal. The method also includes inputting the POD control signal having the dynamic gain into an output signal limiter having dynamic limits that are openable and closeable, wherein the dynamic limits define a maximum output of the controller. The method also includes counting, via a counter, each pulse in the POD control signal with respect to time, wherein the pulse is a rising edge of the POD control signal that deviates in a positive direction or a negative direction from zero. The method also includes selectively opening and closing the dynamic limits of the output signal limiter based on a pulse count with respect to time. The method also includes outputting the POD control signal in response to the output signal limiter being opened.

One or more embodiments includes a non-transitory computer readable medium may include executable instructions for performing a computer-implemented method to selectively pass and damp oscillations of an electric power grid via a power electronic device. The non-transitory computer readable medium also includes generating, via a controller, a power oscillation damper control signal based on one or more input signals from the electric power grid. The non-transitory computer medium also includes determining a dynamic gain based on an amplitude of the oscillations, a duration of the oscillations, and a rate of damping of the oscillations in the one or more input signals. The non-transitory computer medium also includes applying the dynamic gain to the POD control signal to modify the amplitude of the POD control signal. The non-transitory computer medium also includes inputting the POD control signal having the dynamic gain into an output signal limiter having dynamic limits that are openable and closeable, wherein the dynamic limits define a maximum output of the controller. The non-transitory computer medium also includes counting, via a counter, each pulse in the POD control signal with respect to time, wherein the pulse is a rising edge of the POD control signal that deviates in a positive direction or a negative direction from zero. The non-transitory computer medium also includes selectively opening and closing the dynamic limits of the output signal limiter based on a pulse count with respect to time. The non-transitory computer medium also includes outputting the POD control signal in response to the output signal limiter being opened.

Implementations of one or more embodiments may also include one or more of the following features.

The controller, method, or medium may further be configured to include a linear control path having one or more lag compensators to adjust phase and remove noise, one or more lead-lag compensators to adjust phase and remove noise, one or more washout filters to remove DC-offset and low frequency noise, and one or more proportional gains.

The controller, method, or medium may further be configured to determine whether a magnitude of oscillation in the one or more input signals is above or below an oscillation magnitude threshold, pass input signals having oscillations that are below the oscillation magnitude threshold unmodified to allow self-damping, and modify input signals having oscillations that are above the oscillation magnitude threshold with the dynamic gain.

The controller, method, or medium may further be configured to reset the counter in response to no pulses being detected within a first predetermined period of time, reset the first predetermined period of time in response to a pulse being detected, close the dynamic limits of the output signal limiter in response to the pulse count reaching a maximum pulse count within a second predetermined period of time, close the dynamic limits of the output signal limiter in response to the pulse count being incremented within the first predetermined period of time of the second predetermined period of time elapsing, open the dynamic limits of the output signal limiter in response to the maximum pulse count not being exceeded within the second predetermined period of time and the pulse count not being incremented within first predetermined period of time of the second predetermined period of time elapsing, and limit the POD control signal by the dynamic limits of the output signal limiter.

The controller, method, or medium may further be configured to include a linear control path having a pulse counter logic circuit, and the pulse counter logic circuit includes: one or more logic gates; an impulse detector configured to output a first logic output signal indicating a rising edge in the positive direction or the negative direction of the POD control signal; an initial pulse detector configured to output a second logic output signal indicating a first increment of the counter; an edge detector configured to output a third logic output signal for a predetermined period of time, the third logic output signal indicating a change in an input of the edge detector; a delay configured to output a fourth logic output signal after a predetermined waiting period of time, the fourth logic output signal indicating a sustained change in an input of the delay; a dynamic limiter setter configured to open and set the dynamic limits of the output signal limiter; and a maximum pulse detector configured to output a fifth logic output signal indicating that the counter has reached a predetermined maximum number of pulses.

The controller, method, or medium may further comprise an input dynamic limiter having a maximum limit and a minimum limit that are openable and closeable, and the controller may further be configured to measure a bus voltage of the power electronic device; determine whether the bus voltage is within a predetermined operating range; open the maximum limit and the minimum limit of the input dynamic limiter in response to determining that the bus voltage is within the predetermined operating range; and close the maximum limit and the minimum limit of the input dynamic limiter in response to determining that the bus voltage is outside of the predetermined operating range to set an input signal value of the input dynamic limiter to zero.

The controller, method, or medium may be configured to generate the POD control signal by applying one or more lag compensators and one or more lead-lag compensators to adjust a phase and remove noise of the one or more input signals, one or more washout filters to remove DC-offset and low frequency noise, and one or more proportional gains, apply one or more dynamic limiters having openable and closeable limits, and apply one or more deadbands to the POD signal.

The controller, method, or medium may further be configured to scale the POD control signal before determining the dynamic gain by amplifying higher magnitude variations in the POD control signal and reducing lower magnitude variations in the POD control signal.

The controller, method, or medium may further be configured to determine the dynamic gain based on the one or more input signals by: taking an absolute value of the POD control signal having a DC-offset removed; applying an integrator with unity feedback to the absolute value of the POD control signal; determining a rate of change in the POD control signal after the integrator, which represents a rate of damping of the oscillations; limiting the POD control signal by a dynamic limiter, which has dynamic limits that are openable and closeable, the dynamic limits of the dynamic limiter defining a maximum damping rate and a minimum damping rate of oscillation range to be acted upon; determining a dynamic gain scaling factor based on a limited damping rate of the oscillations; and applying the dynamic gain scaling factor to the POD control signal as the dynamic gain.

The one or more input signals may include a first input signal and a second input signal, and the controller may further be configured to generate a first POD control branch signal for the first input signal and a second POD control branch signal for the second input signal, and apply a first dynamic gain to the first POD control branch signal, apply a second dynamic gain to the second POD control branch signal, and combine the first POD control branch signal and the second POD control branch signal having the first dynamic gain and the second dynamic gain via a summer to form the POD control signal.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present disclosure.

DETAILED DESCRIPTION

Figure 1:
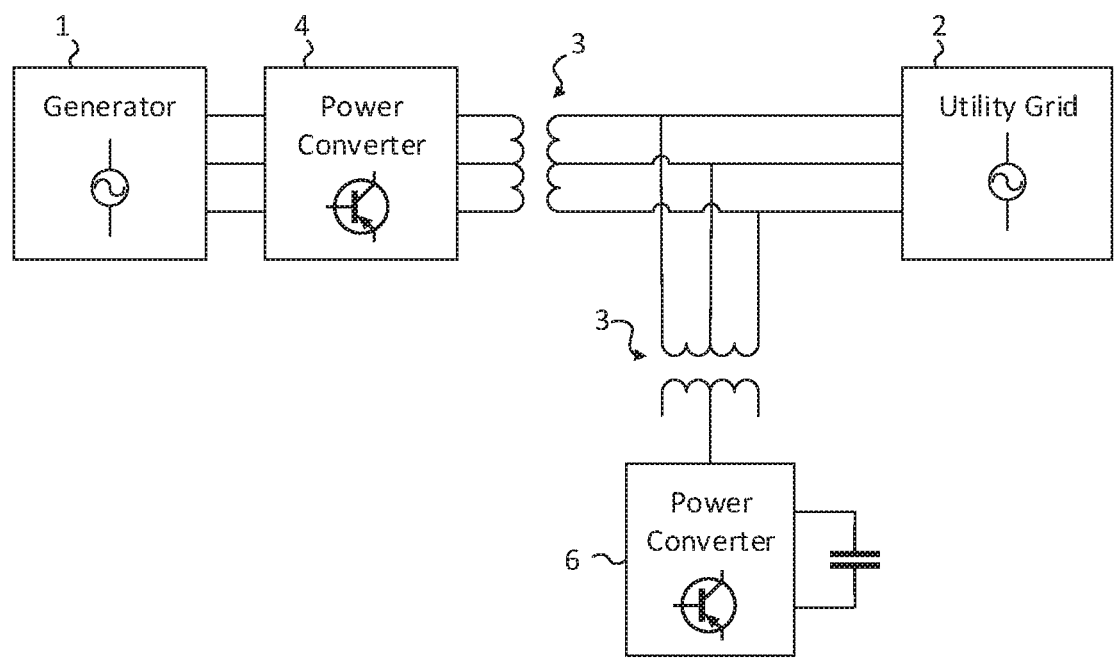
FIG. 1 is a simplified, schematic circuit diagram of a utility grid including power electronic devices according to the disclosed embodiments.

The instant disclosure is provided to further explain in an enabling fashion the best modes of performing one or more embodiments. The disclosure is further offered to enhance an understanding and appreciation for the inventive principles and advantages thereof, rather than to limit in any manner the embodiments.

It is further understood that the use of relational terms, such as first and second, if any, are used to distinguish one from another entity, item, or action without necessarily requiring or implying any actual such relationship, numerical limit, or order between such entities, items or actions. Some embodiments may include a plurality of processes or steps, which can be performed in any order unless expressly and necessarily limited to a particular order (i.e., processes or steps that are not so limited may be performed in any order).

The disclosed power oscillation damping system and method may be implemented for electric grid application to improve sensitivity, selectivity, and security compared to other systems and methods for damping power oscillations in a utility grid.

The disclosed system and method includes a damping ratio dynamic gain control logic circuit ("DRDG control logic"). The DRDG control logic automatically determines the level of damping in power oscillations, and either allows well-damped oscillations to self-damp or provides a power oscillation damper control signal ("POD control signal" or "control signal") to compensate for undamped and poorly damped oscillations. The one or more control signals includes varying degrees of compensation depending on the actual amplitude and duration of the specific power oscillations.

In addition to the DRDG control logic, the system and method also includes a pulse counter logic circuit ("pulse counter logic") to control the system and method's selectivity to power oscillation phasing. In particular, the pulse counter logic allows the system and method to selectively respond to the phasing of the power oscillations and effectively confine the minimum and maximum oscillation frequencies that triggers, or does not trigger, a power oscillation damper control signal response from the components of the system and method to damp the power oscillations.

As will be discussed in greater detail below, the system and method includes a controller having a linear control path with the DRDG control logic and the pulse counter logic that produces a POD control signal. The linear control path includes one or more dynamic limiters, and may include one or more deadbands, that enable the power oscillation damper with dynamic gain control system to selectively enable the controller or disable the controller in response to power oscillations. The ability to disable the controller provides not only enhances selectivity but also provides increased security since the controller cannot be overridden to perform operations that may result in maloperation or damage components of the utility grid.

The disclosed system and method is applicable to a wide range of one or more power electronic devices including, but not limited to, Static Volt-Ampere Reactive Compensators (SVCs), Static Synchronous Compensators (STATCOMs), Voltage Source Converters (VSCs) for High Voltage Direct Current (HVDC) transmission, as well as converter interfaced resources such as wind, solar, and energy storage.

The controller of any one of these power electronic devices is able to utilize either active or reactive power (or current) to selectively damp power oscillations with the POD control signal when implemented with the disclosed system and method. To do so, power oscillations are damped by injecting or absorbing reactive power for appropriate periods of time to either speed up or slow down one or more electromechanical rotating machines (typically generators) in the electric grid, local to the power electronic device, by influencing the respective rotating machines' terminal voltage magnitude. This controller can also be used to control active power and modulate the phase relationship of the power electronic device's voltage angle with the power system's voltage angle to alter its active power injection or absorption in a manner to either speed up or slow down one or more electromechanical rotating machines (typically generators) in the electric grid, local to the device, with only gain and phase tuning modifications to the logic described below. Note for active power to be used, the device being controlled needs some internal energy or active power provision capability (including, but not limited to, chemical, electrochemical, electromagnetic, mechanical, or thermal energy).

Figure 2:
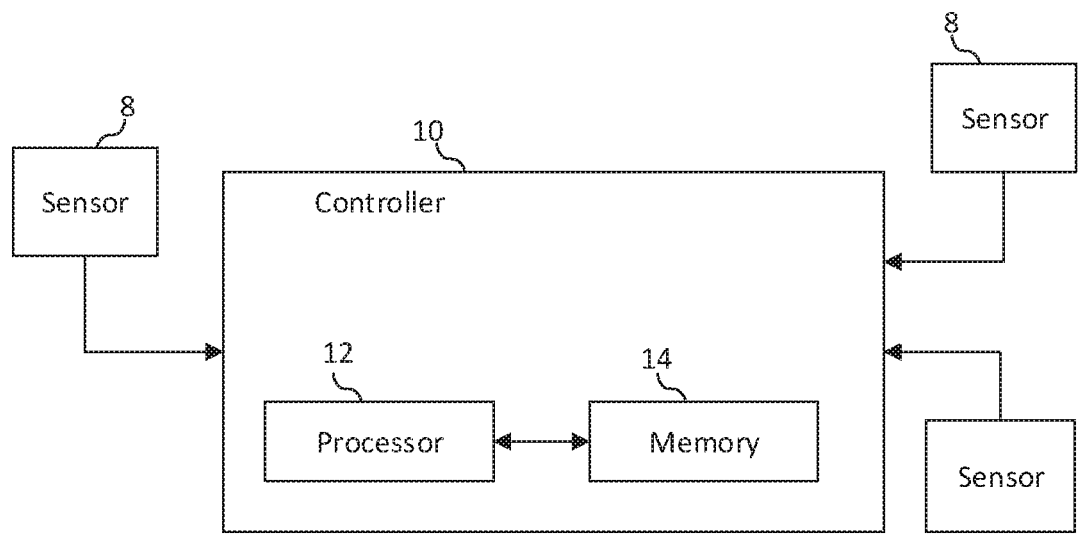
FIG. 2 is a schematic diagram of the computer architecture of a controller in one of the power electronic devices in FIG. 1 according to the disclosed embodiments.

FIG. 1 shows an example schematic diagram with different types of power electronic devices, and FIG. 2 shows an example controller architecture of the controller in any one of the power electronic devices in FIG. 1. In particular, FIG. 1 shows a power generator 1 connected in a utility grid 2 with one or more transformers 3. The power generator 1 can be an AC power generator or a DC power generator, which generates electric power for the utility grid 2.

The utility grid 2 shown in FIG. 1 is a simplified schematic representation. As will be understood by one skilled in the art, the utility grid 2 may include a distribution grid, a transmission grid, low voltage lines (e.g., 50 kV), medium voltage lines (e.g., 110 kV), high voltage lines (e.g., 265 kV to 275 kV), and one or more substations.

FIG. 1 also shows that the utility grid 2 may include one or more power converters (or inverters), such as a series-connected power converter 4 and/or a shunt-connected power converter 6. The series-connected power converter 4 is any power electronic device connectable in series with the power generator 1 in the utility grid 2, such as a converter, an inverter, or a rectifier (e.g., a voltage source converter performing either an inverter operation or a rectifier operation).

The series-connected power converter 4 may convert AC power generated by the power generator 1 into DC power, or the series-connected power converter 4 may convert DC power generated by the power generator 1 into AC power. Similarly, the series-connected power converter 4 may convert AC power into AC power, or DC power into DC power, to improve an aspect of the power generated by the series-connected power converter 4 to be suitable for the utility grid 2. For example, an AC-to-AC power conversion may occur when the power generator 1 produces AC power with a frequency that is not suitable for a utility grid 2 (e.g., 60 Hz), such when electricity is generated by a wind-based power generator. Similar conversions are performed for other types of power generators 1, as will be understood by one skilled in the art.

As another example of a power electronic device, FIG. 1 also shows that the utility grid 2 may also include a shunt-connected power converter 6. The shunt-connected power converter 6 is a power electronic device connectable in parallel (shunt) to a power generator 1 in a utility grid 2 via a transformer 3. The shunt-connected power converter 6 is installed in the utility grid 2 to increase the stability of the voltage or the power. The shunt-connected power converter 6 may, or may not, be connected via a transformer 3. The shunt-connected power converter 6 may include an internal voltage source, which is shown schematically by the capacitor depicted in FIG. 1. This internal voltage source is one example of an energy source that can be utilized by a power electronic device to allow injection of active or reactive power into the system for purposes of power oscillation control. Examples of the shunt-connected power converter 6 include, but are not limited to, SVCs and STATCOMs.

The series-connected power converter 4 and/or the shunt-connected power converter 6 may include any number of power switching elements (power transistors) such as insulated gate bipolar transistors (IGBTs) or metal oxide semiconductor field effect transistors (MOSFETs). The power switching elements are symbolically shown in the series-connected power converter 4 and the shunt-connected power converter 6 in FIG. 1 as transistors. The power switching elements of these power electronic devices can be selectively controlled (e.g., gate controlled) to modulate any number of signals provided to inject or absorb active or reactive power with the utility grid 2.

As seen in FIG. 1, the power generator 1 and series-connected power converter 4 are connected to the utility grid 2 via a transformer 3. The shunt-connected power converter 6 is also connected to the utility grid 2 via a transformer 3. The transformers 3 may step up, or step down, the voltage generated by the power generator 1, the series-connected power converter 4, or the shunt-connected power converter 6 before it is applied to, or received from, the utility grid 2.

As discussed above, the disclosed system and method for power oscillation damping with dynamic gain control can be implemented in a controller in any one of the above power electronic devices to produce the POD control signal, such as a controller of the power generator 1, the series-connected power converter 4, and/or the shunt-connected power converter 6. This is schematically shown in FIG. 2, which shows a controller 10 that represents any of the controllers in the power electronic devices of FIG. 1.

The controller 10 includes one or more processors 12 ("processor") and memory 14. The memory 14 of the controller 10 may include storage of data and programs to achieve the system and method of the present disclosure. The processor 12 executes the functions and/or programs stored in the memory 14 of the controller 10.

The controller 10 controls one or more of the power electronic devices shown in FIG. 1 with the POD control signal to damp power oscillations by causing the power electronic device to inject or absorb reactive power for appropriate periods of time to, for example, either speed up or slow down one or more electromechanical rotating machines of the power generator 1 by changing the terminal voltage magnitude of the electromechanical rotating machines.

The controller 10 can also be used to control active power and modulate the phase relationship of the power electronic device's voltage angle with the voltage angle of the utility grid 2 to alter its active power injection, or absorption, in a manner to speed up or slow down the one or more electromechanical rotating machines of the power generator 1 based on the gain and phase tuning modifications provided by the control logic described in greater detail below.

In order for active power to be used in one or more embodiments, the power electronic device having the controller 10 needs an internal energy source, or active power provision capability, such as chemical, electrochemical, electromagnetic, mechanical, or thermal energy. As noted above, an example of the internal energy source is schematically shown, in FIG. 1 with the capacitor connected to the power regulator 6 as an example of an internal energy source.

As shown in FIG. 2, controller 10 is coupled to one or more sensors 8. The sensors 8 input signals into the controller 10 from the utility grid 2 or any one of the power electronic devices such as a power generator 1, the series-connected power converter 4, and the shunt-connected power converter 6. These signals measured by the sensors 8 may be, for example, the active component of the line current, the branch power, the node voltage, and/or the bus voltage.

The controller 10 measures an input signal for the linear control path and acts upon it so long as the bus voltage magnitude at the power electronic device is within a continuous voltage range. Otherwise, the device prioritizes its normal control objectives without providing the control. These normal objectives could include priorities, e.g., reactive power provision associated with a specific reference value of reactive power or system voltage, active power injection or absorption associated with a specific reference value of active power or system frequency, or supporting the system during abnormal conditions via other specific control functions. The initial prioritization between the POD control and normal control objectives is performed by a dynamic limiters that is adjusted based on the bus voltage.

The input signal for the controller 10 may be one or more input signals for which processing is performed in separate branches of the linear control path to form one or more branch signals and the resultant signals are later combined in the linear control path to form the POD control signal, as discussed below. The one or more input signals may be, e.g., the active component of the line current, the branch power, or the node voltage.

Figure 3:
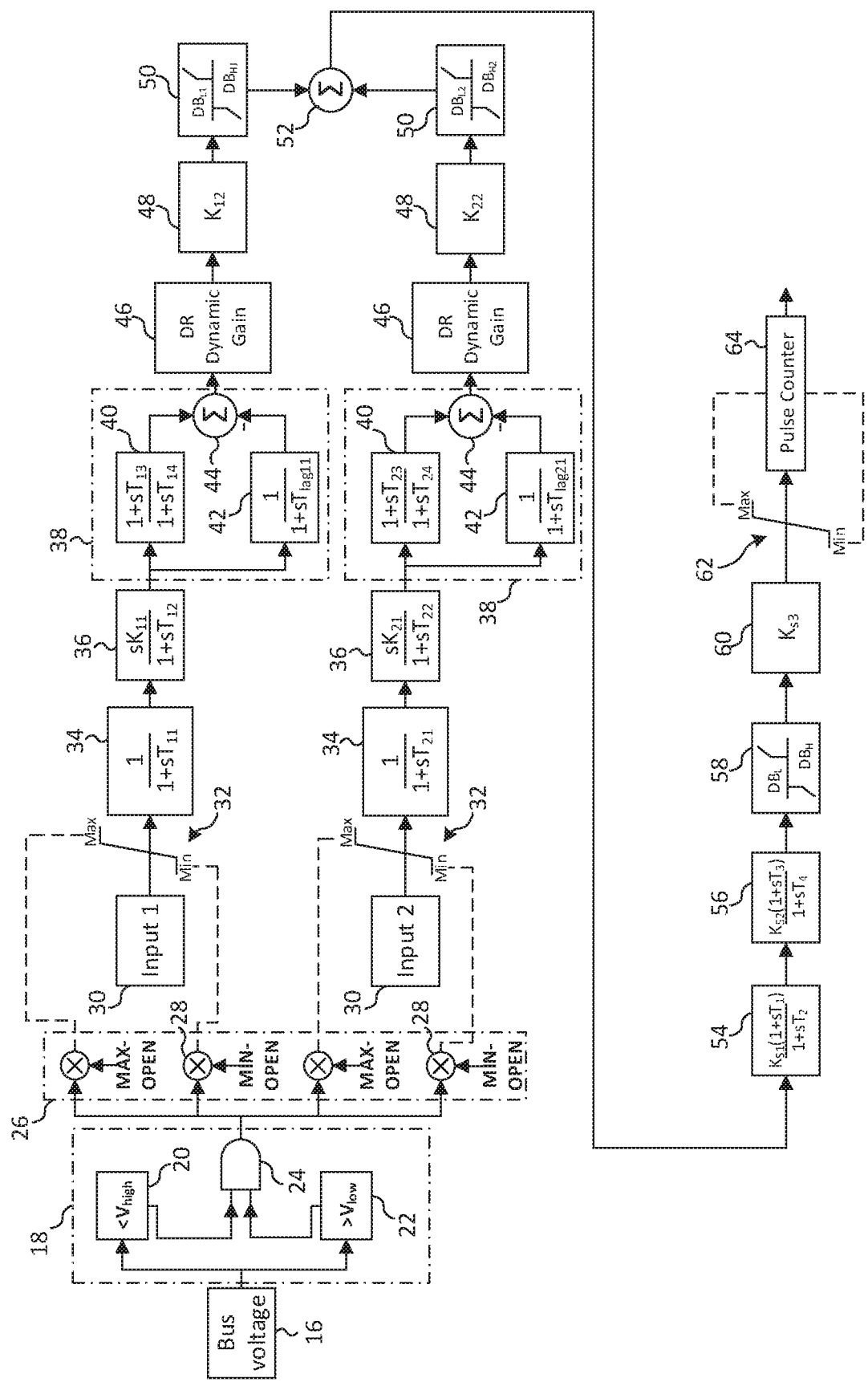
FIG. 3 is a logic circuit diagram including transfer functions within the controller of FIG. 2 according to the disclosed embodiments.
Figure 4:
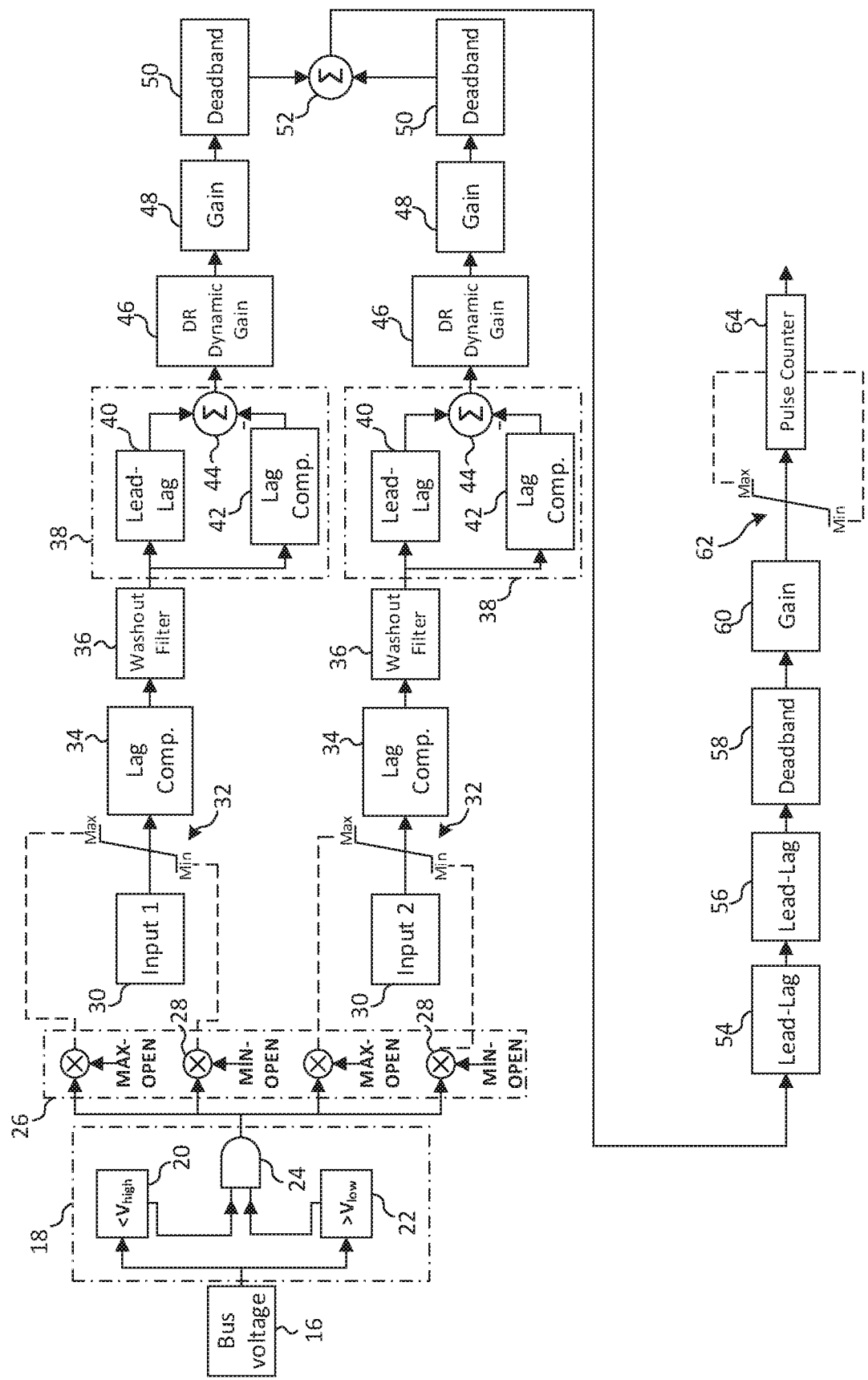
FIG. 4 is a logic circuit diagram including descriptive text for the corresponding transfer functions in FIG. 3 according to the disclosed embodiments.

An example of the overall control path of the system and method is shown in FIGS. 3 and 4, which show control logic circuit diagrams. FIG. 3 explicitly shows the transfer functions, time constants, and gains for the different control circuit components, and FIG. 4 shows the different control circuit components as functional blocks with descriptive text for ease of discussion and reference.

Figure 5:
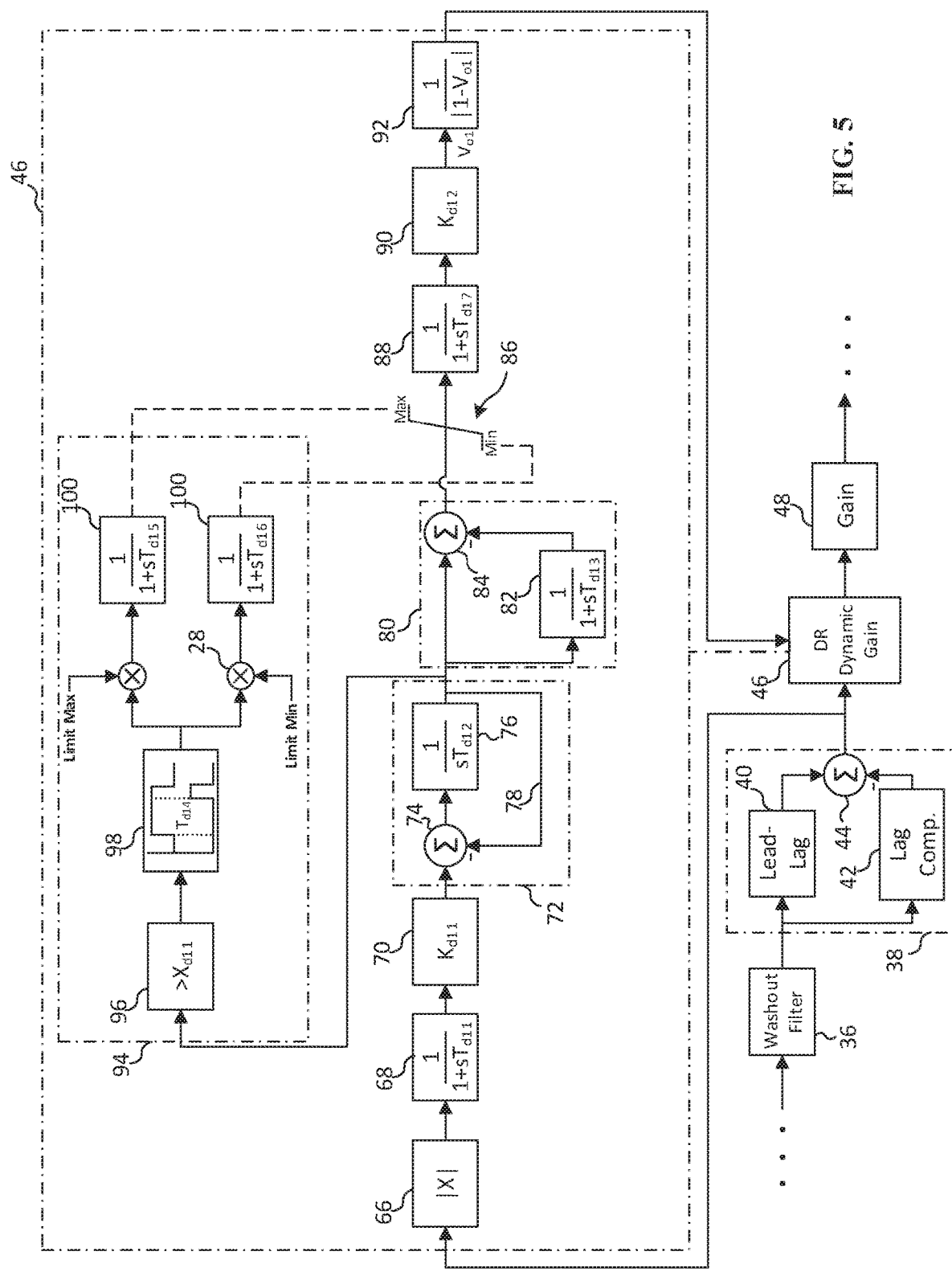
FIG. 5 is a logic circuit diagram of the damping ratio dynamic gain control logic including transfer functions of FIGS. 3 and 4 according to the disclosed embodiments.
Figure 6:
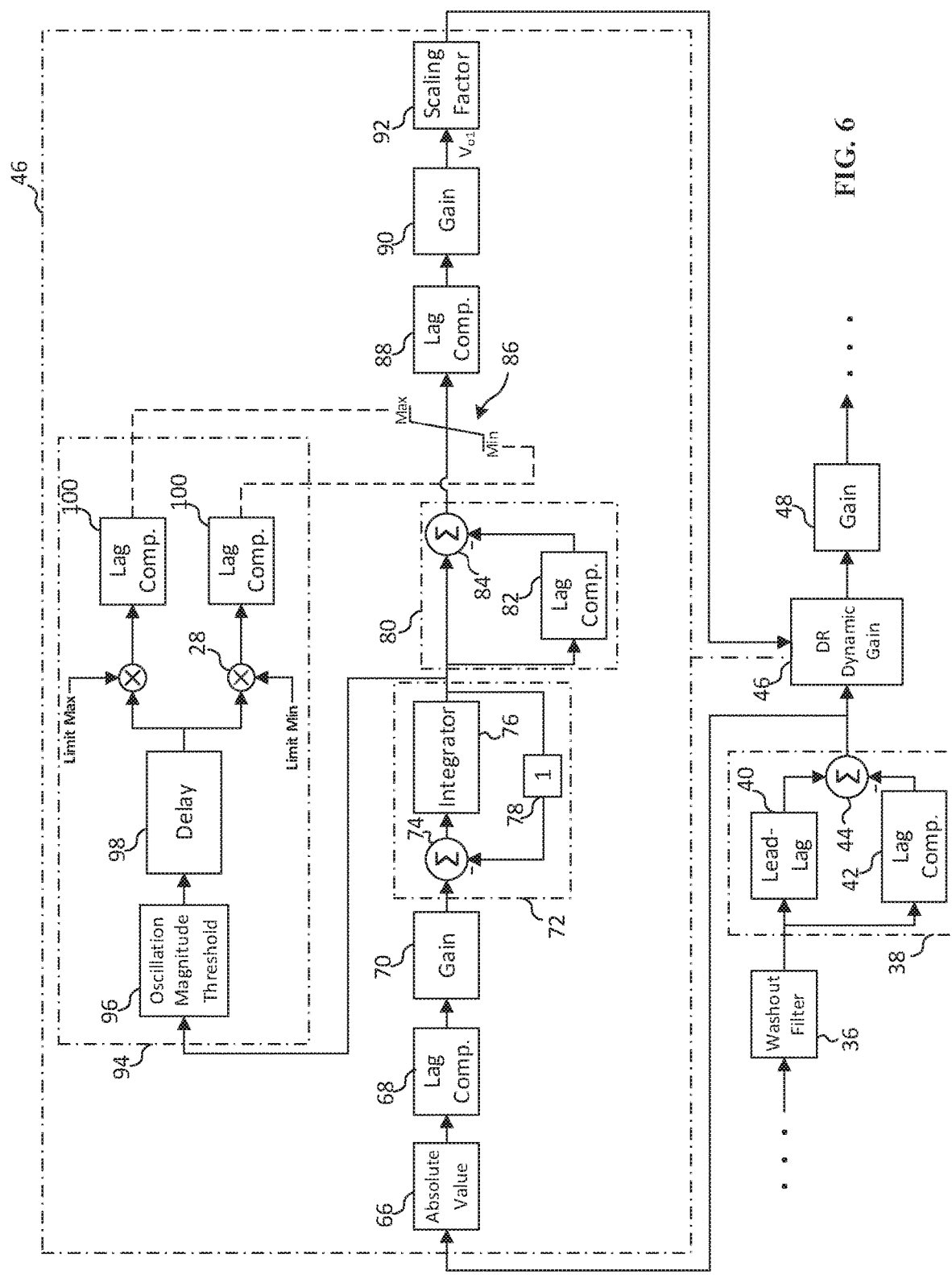
FIG. 6 is a logic circuit diagram of the damping ratio dynamic gain control logic of FIG. 5 including descriptive text for the corresponding transfer functions according to disclosed embodiments.
Figure 7:
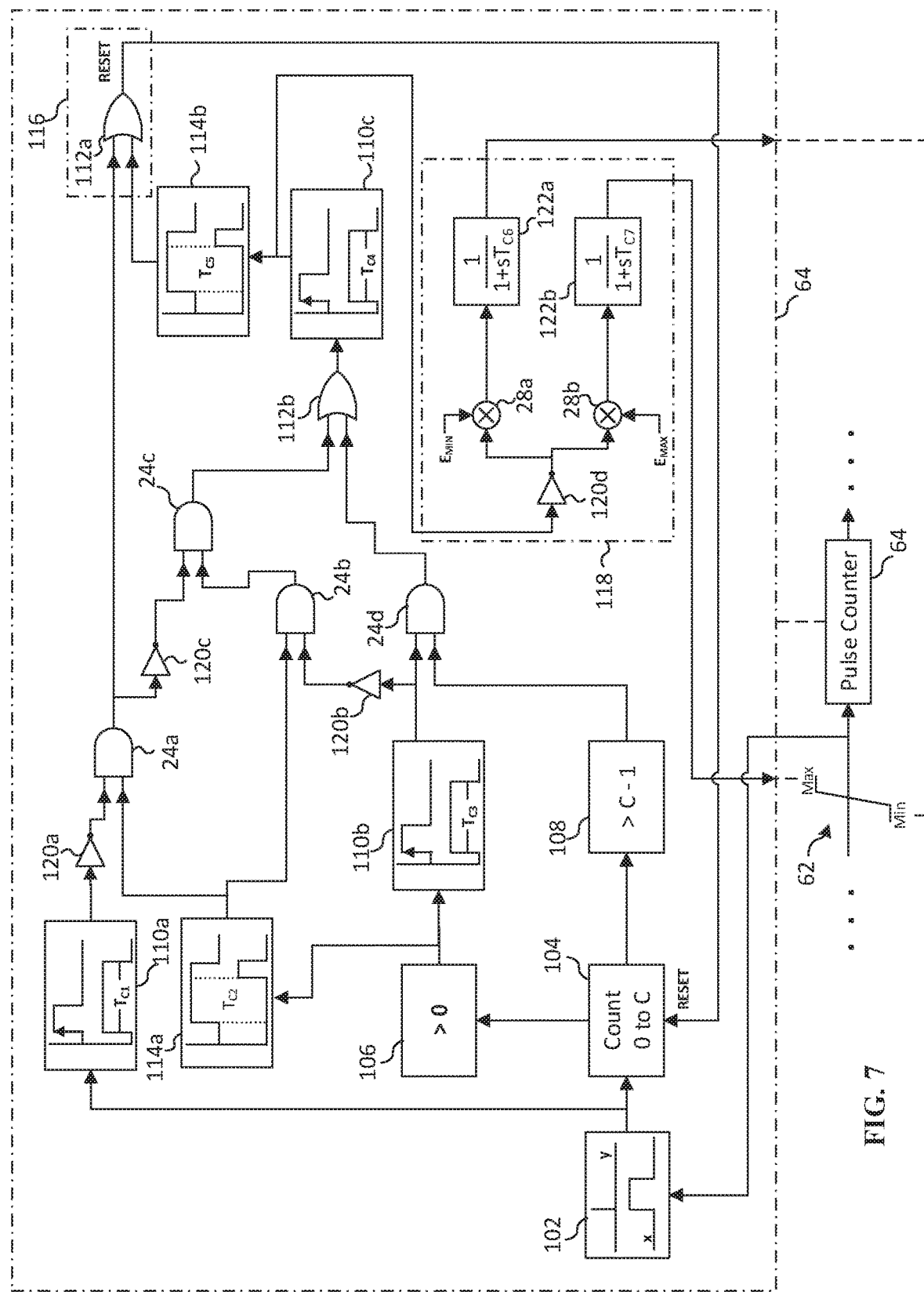
FIG. 7 is a logic circuit diagram of the pulse counter logic including transfer functions of FIGS. 3 and 4 according to disclosed embodiments.
Figure 8:
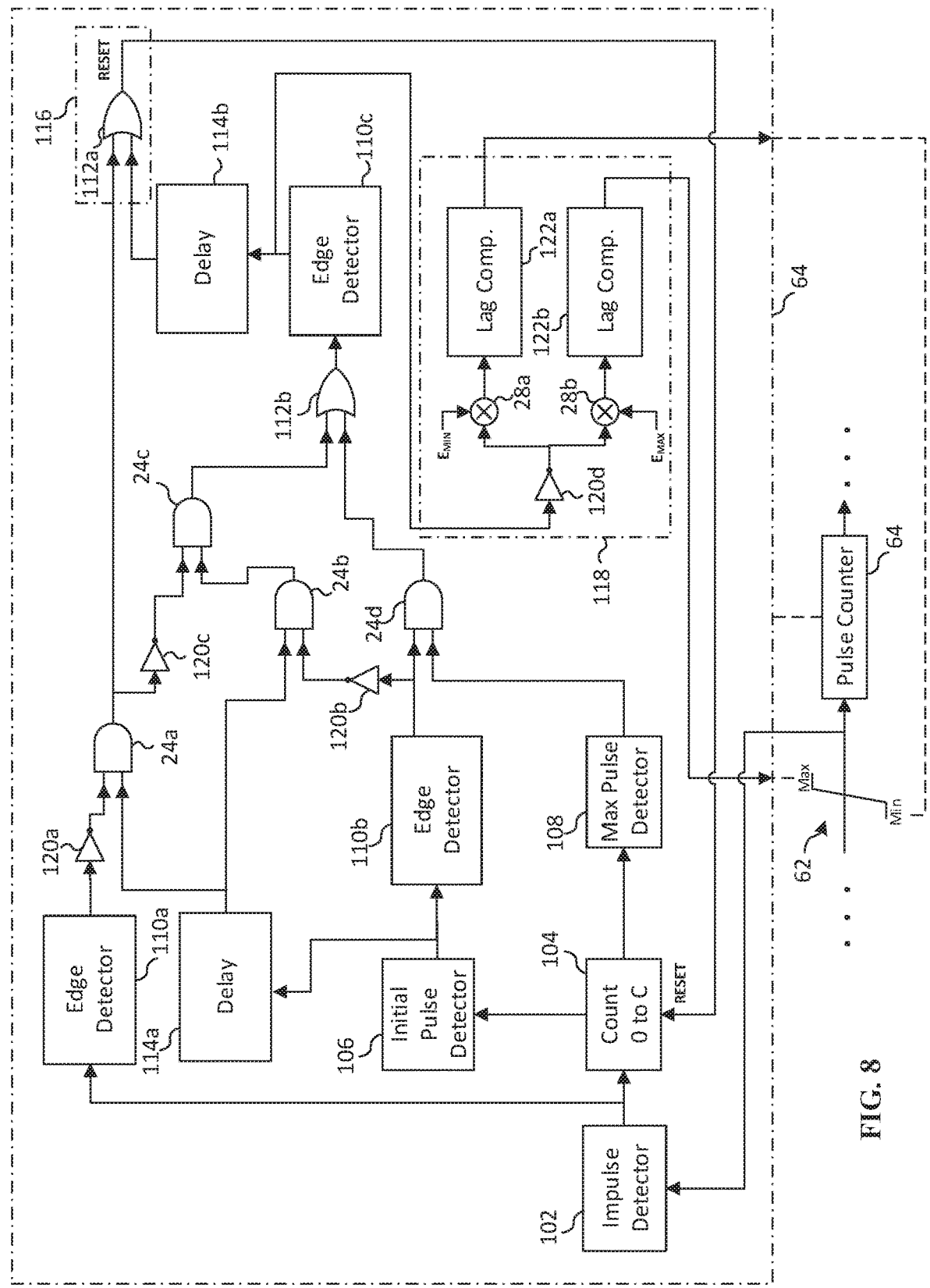
FIG. 8 is a logic circuit diagram of the pulse counter logic of FIG. 7 including descriptive text for the corresponding transfer functions in FIG. 7 according to disclosed embodiments.

Similar illustrations of the control circuit components with their respective transfer functions, time constants, and gains as well as their corresponding functional block representations are provided for the DRDG logic in FIGS. 5 and 6 as well as the pulse counter logic in FIGS. 7 and 8 for ease of discussion and reference.

As discussed above, the controller 10 acts upon one or more input signals so long the bus voltage magnitude at the power electronic device is within a continuous voltage range. In FIGS. 3 and 4, the bus voltage 16 is input into a bus voltage range determiner 18. The bus voltage range determiner 18 outputs a signal to an input dynamic limit determiner 26 that opens and closes the dynamic limits of an input limiter 32. The input limiter 32 enables, or disables, the input of one or more input signals 30 measured by the sensors 8 in FIG. 2 to be acted upon.

In order for the bus voltage range determiner 18 to make this initial determination to enable the controller 10, the bus voltage range determiner 18 includes an upper bus voltage range 20 ($V_{high}$) and a lower bus voltage range 22 ($V_{low}$). The upper bus voltage range 20 and the lower bus voltage range 22 may be, for example, 1.05 per-unit and 0.95 per-unit respectively.

The bus voltage range determiner 18 also includes an AND gate 24. The AND gate 24 will output a logical one when both of its inputs are also a logical one. The upper bus voltage range 20 will output a signal to a first input of the AND gate 24 when the bus voltage 16 is below the upper bus voltage range 20. The lower bus voltage range 22 will output a signal to a second input of the AND gate 24 when the bus pulled to 16 is above the lower bus voltage range 22. Consequently, the AND gate 24 of the bus voltage range determiner 18 will output a signal to the input dynamic limit determiner 26 in response to the bus voltage 16 being within a continuous voltage range defined by the upper bus voltage range 20 in the lower bus voltage range 22.

The input dynamic limit determiner 26 includes multipliers 28 that multiply the logical one output by the AND gate 24 of the bus voltage range determiner 18 by an open upper limit and an open lower limit for the linear control path shown in FIGS. 3 and 4. In FIGS. 3 and 4, the open upper limit is represented as MAX-OPEN and the open lower limit is represented as MIN-OPEN.

Since the upper bus voltage range 20 and the lower bus voltage range 22 of the bus voltage range determiner 18 determine whether to open or close the linear control path, the particular values of the open upper limit and the open lower limit of the input dynamic limit determiner 26 can be set at arbitrarily high and low values to ensure that the one or more input signals are input into the linear control path of the controller 10 when the bus voltage 16 is within the continuous range.

For example, the open upper limit of the input dynamic limit determiner 26 can be set in the controller 10 as an arbitrarily high value such as +9999 in the open lower limit of the input dynamic limit determiner 26 can be set in the controller as an arbitrarily low value such as −9999. By setting the open upper limit and the open lower limit of the input dynamic limit determiner 26 to these arbitrary values (i.e., extreme values) this will allow control of the input limiter 32 to be based on the operation of the bus voltage range determiner 18.

As noted above, one or more input signals 30 may be used in the linear control path of the controller 10. In FIGS. 3 and 4, the linear control path is shown with two branches, which prepare branch signals (branch control signals). The two branches are shown as an example for purposes of discussion. However, the number of branches in the linear control path is not particularly limited so long as it is equal to, or greater than, one branch. In other words, there can be only one branch or more than the two branches shown in FIGS. 3 and 4.

For purposes of simplicity, only one of the two branches shown in FIGS. 3 and 4 will be discussed explicitly below. The linear control path includes multiple transfer functions that implement one or more lag compensators and one or more lead-lag compensators to adjust phase and remove noise, one or more washout filters to remove a DC-offset and low frequency noise from the signal, and one or more proportional gains. The linear control path of the controller 10 also includes one or more deadbands (also known as dead zones) that generate zero output when the input is within a lower limit and an upper limit.

The one or more lag compensators of the linear control path have the general form of the following transfer function shown below in Formula 1:

$$\frac{1}{1+sT_n} \qquad \text{Formula 1}$$

In the general form of the lag compensator transfer function shown above in Formula 1, s represents the complex variable in the Laplace domain (the s domain or frequency domain), and $T_n$ represents the time constant for the transfer function.

The one or more lead-lag compensators of the linear control path have the general form of the following transfer function shown below in Formula 2:

$$\frac{1+sT_{n1}}{1+sT_{n2}} \qquad \text{Formula 2}$$

In the general form of the lead-lag compensator transfer function shown above in Formula 2, s represents the complex variable in the Laplace domain (the s domain or frequency domain), and $T_{n1}$ and $T_{n2}$ represent the two time constants for the transfer function.

The lag compensators and the lead-lag compensators have specific time constants that define their input-output characteristics. In the discussion below, the time constants for the lag compensators and the lead-lag compensators will be discussed without reproducing the general formulas for the transfer functions. However, FIGS. 3, 5, and 7 explicitly show the transfer functions with the time constants for ease of reference.

Returning to FIGS. 3 and 4, after passing through the open dynamic limits of the input limiter 32, the input signal 30 is received by a first lag compensator 34. The lag compensator 34 has a time constant $T_{11}$, $T_{12}$ for removing high-frequency noise from the input signal 30 and for adjusting the phase of the input signal 30, and the first lag compensator 34 serves as a low-pass filter.

After the one or more input signals 30 are passed through the first lag compensator 34, the linear control path produces a POD control signal (which may also be referred to as a branch control signal if there are multiple input signals 30). The POD control signal is a modified version of the one or more input signals 30.

The control signal is then passed to a washout filter 36. The washout filter 36 is a stable high-pass filter with zero static gain. The washout filter 36 eliminates the steady state offset (i.e., the DC offset or DC bias) in the control signal and filters out low-frequency noise.

The washout filter 36 has the following transfer function shown below in Formula 3:

$$\frac{sK}{1+sT} \quad \text{Formula 3}$$

In Formula 3, s represents the complex variable in the Laplace domain (the s domain or frequency domain), K represents a proportional gain of the washout filter 36, and T represent the time constant of the washout filter 36. The washout filter 36 has a proportional gain $K_{11}$, $K_{21}$ and a time constant $T_{12}$, $T_{21}$ for the one or more input signals 30 in each branch.

After passing through the washout filter 36, the control signal is then passed to an error scaler 38. The error scaler 38 amplifies the higher magnitude variations in the control signal and reduces the lower magnitude variations in the control signal. As seen in FIGS. 3 and 4, the error scaler 38 includes a first lead-lag compensator 40, a second lag compensator 42, and a first summer 44 (summing junction).

The error scaler 38 receives the output of the washout filter 36, which has removed the steady state offset and low-frequency noise of the input signal 30 in the control signal. The error scaler 38 feeds the control signal into both the first lead-lag compensator 40 and the second lag compensator 42. The first lead-lag compensator 40 has a numerator time constant $T_{13}$, $T_{23}$ and a denominator time constant $T_{14}$, $T_{24}$ for the error scaling function of the error scaler 38. The second lag compensator 42 has a time constant $T_{lag11}$, $T_{lag12}$ for the error scaler 38. The output of the lag compensator 42 is fed into a negative input of a first summer 44, and the output of the first lead-lag compensator 40 is set into a positive input of the first summer 44.

Via the first summer 44, the error scaler 38 subtracts the lag compensated output of the lag compensator 42 from the lead-lag compensated output from the first lead-lag compensator 40. That is, the error scaler 38 adds a negative lag compensated signal to the output of the washout filter 36 after it has been passed through a first lead-lag compensator 40. This feedback loop of the error scaler 38 will amplify the higher magnitude variations in the control signal and reduce the low magnitude variations in the control signal after the washout filter 36. For example, low magnitude variations in the control signal will be reduced in the first summer 44, and the high magnitude variations in the control signal will be increased in the first summer 44.

The output of the error scaler 38 is then input into the DRDG control logic 46. The DRDG control logic 46 will be discussed in greater detail below with reference to FIGS. 5 and 6. In brief, the DRDG control logic 46 will create a time varying proportional gain that modifies the signal after the error scaler 38. The dynamic gain (a time-varying proportional gain) provided by the DRDG control logic 46 will selectively apply a dynamic gain so that oscillations in the input signal 30 that are well-damped will be unmodified and, on the other hand, un-damped or poorly damped oscillations in the input signal 30 will be modified by the dynamic gain.

Returning to FIGS. 3 and 4, the output of the DRDG control logic 46 having been applied with the dynamic gain is passed to a first proportional gain 48. Proportional gains, in general, adjust the magnitude of the sinusoidal signal. The first proportional gain 48 has a proportional gain $K_{12}$, $K_{22}$ that prepares the signal for the first deadband 50. Next, the signals passed through a first deadband 50, which has a lower limit $DB_{L1}$, $DB_{L2}$ and an upper limit $DB_{H1}$, $DB_{H2}$. As noted above, the first deadband 50 will provide a zero output when a given signal is within the lower limit and the upper limit of the first deadband 50.

In FIGS. 3 and 4, the lower limit and the upper limit of the first deadband 50 are shown as $DB_{L1}$ and $DB_{H1}$ for the first branch (upper branch) of the linear control path and $DB_{L2}$ and $DB_{H2}$ for the second branch (lower branch) of the linear control path. By providing the first deadband 50, the linear control path will prevent the controller 10 from responding to signals within a range that is not desired or the controller 10 is capable of handling. This provides greater selectivity and security to the system and method of the present disclosure.

The linear control path also includes a multiple-input-signal summer 52. The multiple-input-signal summer 52 adds together the control signals provided by the first branch and the second branch of the linear control path. That is, the branch control signal in the first branch and the branch control signal in the second branch independently pass through the lag compensator 34, the washout filter 36, the error scaler 38, the DRDG control logic 46, the first proportional gain 48, and the first deadband 50 before the two independent signals are summed together by the multiple-input-signal summer 52 to form the POD control signal.

The output of the multiple-input-signal summer 52 (i.e., the POD control signal) is then fed to a second lead-lag compensator 54 and a third lead-lag compensator 56. The second and third lead-lag compensators 54, 56 adjust the phase and remove noise from the combined POD control signal after it is output by the multiple-input-signal summer 52.

The second lead-lag compensator 54 has the following transfer function shown below in Formula 4:

$$\frac{K_{S1}(1+sT_1)}{1+sT_2} \quad \text{Formula 4}$$

In Formula 4, $K_{S1}$ is a proportional gain for the control signal in the linear control path, s represents the complex variable in the Laplace domain, and $T_1$ and $T_2$ are the time constants for the control signal in the linear control path.

The third lead-lag compensator 56 has the following transfer function shown below in Formula 5:

$$\frac{K_{S2}(1+sT_3)}{1+sT_4} \quad \text{Formula 5}$$

In Formula 5, $K_{S2}$ is a proportional gain for the control signal in the linear control path, s represents the complex variable in the Laplace domain, and $T_3$ and $T_4$ are the time constants for the control signal in the linear control path.

The POD control signal is then input into a second deadband 58. The second deadband 58 also allows the controller 10 to selectively decide whether or not to respond to one or more input signals 30 since the second deadband 58 will output a zero when the combined control signal is between the lower limit $DB_L$ and the upper limit $DB_H$ of the second deadband 58.

The output from the second deadband 58 is then fed into the second proportional gain 60 in preparation to be passed through an output limiter 62. Second proportional gain 60 has a proportional gain $K_{S3}$.

Like the input limiter 32, the output limiter 62 also includes dynamic limits that are controllable (openable and closable). Specifically, the dynamic limits of the output limiter 62 are controlled by the pulse counter logic 64. The pulse counter logic 64 will be discussed in greater detail below with reference to FIGS. 7 and 8.

In brief, the pulse counter logic 64 opens and closes the dynamic limits of the output limiter 62 to selectively enable and disable the linear control path of the controller 10 from responding to signals having a frequency range within, or outside of, the desired control range of the controller 10. In addition to the selectivity, this provides an additional safety measure against unintended control signals having, for example, too high of a frequency that would destabilize the power electronic device or the utility grid 2.

When the pulse counter logic 64 opens (i.e., keeps open or does not close) the dynamic limits of the output limiter 62, the control signal will be output by the controller 10. As discussed above, the control signal output by the linear control path will damp power oscillations by injecting or absorbing reactive or active power in order to speed up or slow down the electromechanical machines of, e.g., the power generator 1.

The details of the DRDG control logic 46 and the pulse counter logic 64 will now be discussed with reference to FIGS. 5-8. The DRDG control logic 46 is shown with a schematic representation including transfer functions, time constants, and gains in FIG. 5 and corresponding descriptive functional blocks in FIG. 6 for ease of discussion. The DRDG control logic 46 determines a dynamic gain to be applied to the control signal output by the washout filter 36 and the error scaler 38.

The DRDG control logic 46 furthermore determines the level of damping in the oscillations of the input signals 30 at this point in the linear control path. In doing so, the controller 10 can selectively allow well-damped oscillations to self-damp and provide a dynamic gain with a varying degree of compensation to undamped, or poorly damped, oscillations in the input signal 30 for each branch in the linear control. The dynamic gain provided by the DRDG control logic 46 is generally based on the amplitudes and durations of the oscillations in the input signal 30 at this point in the linear control path.

Returning to FIGS. 5 and 6, the output of the washout filter 36 is fed into the error scaler 38. The output of the error scaler 38 is fed into the DRDG control logic 46. The DRDG control logic 46 applies the dynamic gain. The output of the error scaler 38, after being modified by the dynamic gain of the DRDG control logic 46, is fed into the first proportional gain 48 where it returns to the linear control path as shown in FIGS. 3 and 4.

FIGS. 5 and 6 show a detailed view (expanded view) of the DRDG control logic 46. Among other things, the DRDG control logic 46 includes one or more lag compensators, one or more proportional gains, one or more dynamic limiters, and one or more scaling factors.

The DRDG control logic 46 uses integration to determine the magnitude of the oscillations, and the damping characteristics of those oscillations, in order to set the dynamic gain. In general, the integration of a continuous sinusoidal wave will be zero, since a sinusoidal wave has equal positive and negative components. For example, this general principle can be thought of as a sine wave centered around the time axis (the horizontal or y-axis). In its most simplest form, integration is a summation of the area under a curve (i.e., between the curve and the horizontal axis). If a sine wave having equal positive and negative components is integrated, the result of the integration will be zero. This result is not informative in the characteristics in the oscillations of a signal.

To address this issue, FIGS. 5 and 6 show that the output of the error scaler 38 is input into an absolute value block 66. The absolute value block 66 takes the absolute value of the control signal. In other words, the absolute value block 66 serves as a rectifier (a full wave rectifier) for the sinusoidal input into the DRDG control logic 46.

When integration is taken of the absolute value of a signal with unity feedback, this result can be used to characterize, and identify, the damping characteristics of that signal. For example, the integration of the absolute value of a constant magnitude sine wave is an ever increasing value because there is no negative component to reduce the error (difference). On the other hand, if the input stays constant and is fed into unity feedback, then the unity feedback will make the signal eventually converge back to its nominal value (e.g., the result of the subtraction from itself in the unity feedback may be a signal having a small oscillation relative to the oscillation frequency of the input).

Furthermore, one skilled in the art will understand that the oscillations in the input signals 30 as originally received from the sensors 8 may include a DC offset (i.e., a DC bias or a DC component). Visually, the DC offset can be thought of as a sinusoidal signal that is shifted above or below the time axis (i.e., the horizontal axis of a sinusoidal plot in the time domain). The absolute value of a sinusoidal signal that is slightly shifted in the horizontal direction will be different than a sinusoidal signal that is not shifted in the horizontal direction (i.e., that is centered around the time axis) since they will have different negative components. Consequently, if not removed, a DC offset will affect (i.e., interfere with) the accuracy in the determination of the damping characteristics of the signal based on the integration performed by the DRDG control logic 46 and the absolute value discussed above.

The washout filter 36 eliminates the DC offset that may occur in the control signal (originally from the input signal 30). This ensures that the DRDG control logic 46 will take the absolute value of an input signal 30 that is centered around the time axis and subsequently take the integration of that signal to address this issue.

Returning to FIGS. 5 and 6, the absolute value signal is input into a third lag compensator 68, which serves as a low-pass filter to smooth out the signal. The third lag compensator 68 has a time constant $T_{d11}$ for the input signal of the DRDG control logic 46. The output of the lag compensator 68 is scaled by a third proportional gain 70 having a proportional gain $K_{d11}$ in preparation for integration. In general, proportional gains increase the amplitude of the entire waveform, but the net impacts are more significant the greater the input signal (increased absolute delta difference in amplitude).

Next, the DRDG control logic 46 feeds the output from the third proportional gain 70 into an integrator feedback loop 72. The integrator feedback loop 72 includes a second summer 74, an integrator 76, and a unity feedback 78. The integrator 76 as a time constant $T_{d12}$ and integrates the output of the third proportional gain 70. The integration of the signal's smoothed absolute value provides an indicator of the oscillation's amplitude and duration in the input signal 30. The integration may be performed by, for example, summing all values of the signal along the horizontal axis (i.e., determining the area underneath the curve formed by the signal).

The integrated signal is then passed by unity feedback 78 to a negative input of the second summer 74. For purposes of simplicity, the unity feedback 78 is representative with a functional block that multiplies the output of the integrator 76 by one in FIG. 6. However, this is merely for illustrative purposes and an actual multiplication by one is unnecessary to create unity feedback 78, as will be understood by one skilled in the art.

The feedback magnitude performed by the integrator feedback loop 72 develops at a rate that is dependent on the oscillation's magnitude. This causes the output of the integrator 76 to be greater than the input of the integrator 76 when the oscillation is damping. This forces the error (difference signal) into the integrator to be negative until the oscillation is either eliminated, sustained, or subsequently grows.

If the oscillation is eliminated, then the input error into the integrator 76 in steady-state will converge to zero and the output of the integrator 76 will converge to zero. Hence, the integrator feedback loop 72 with the absolute value inputs allow the DRDG control logic 46 to selectively not adjust the response of controller 10 to oscillations in the input signals 30 that will self-damp, since the output of the integrator 76 will converge to zero for these types of oscillations.

On the other hand, when the input to the integrator 76 is based on an input signal 30 having sustained, marginally stable oscillations, the input error into the integrator 76 will change relative to the absolute value of the sustained oscillations and the output of the integrator 76 will converge to a constant magnitude (i.e., a non-zero constant magnitude). Furthermore, when the inputs of the integrator 76 are based on an input signal 30 having growing, undamped oscillations, the input error into the integrator 76 will progressively increase resulting in a continuously growing integrator 76 output.

As a result, the output of the integrator 76 within the integrator feedback loop 72 characterizes the motion, or manner in which the rotating machines in the utility grid 2 oscillate in response to an event or disturbance, and the output of the integrator 76 will characterize the level of damping in the system.

Returning to FIGS. 5 and 6, the output of the integrator 76 is fed into the damping ratio estimation loop 80. The damping ratio estimation loop 80 includes a fourth lag compensator 82 and a third summer 84. The damping ratio estimation loop 80 feeds the output of the integrator 76 into the fourth lag compensator 82 having a time constant $T_{d13}$ to provide a phase delay, and feeds the output of the integrator 76 into a positive input of the third summer 84. The output of the fourth lag compensator 82 is fed into a negative input of the third summer 84. The output of the third summer 84 represents the rate of change in the oscillations' damping with respect to time and its associated decay rate. This is commonly referred to as the damping ratio.

The DRDG control logic 46 feeds the output of the damping ratio estimation loop 80 through a dynamic limiter 86. The dynamic limiter 86 of the DRDG control logic 46 has dynamic limits that depend on the integrator 76 output being above a threshold value for a predetermined period of time. Otherwise, the dynamic limits of the dynamic limiter 86 will close. These features of the dynamic limiter 86 will be discussed in greater detail further below.

When the dynamic limits of the dynamic limiter 86 are open, the output of the damping ratio estimation loop 80 is fed into a fifth lag compensator 88 and a fourth proportional gain 90. The fifth lag compensator 88 has a time constant $T_{d17}$ to smooth out the signal, and the proportional gain 90 has a proportional gain $K_{d12}$ in preparation for outputting and scaling the signal.

The output of the fourth proportional gain 90 provides a scale factor signal ($V_{O1}$), which will determine a scaling factor 92 that represents the dynamic gain (time-varying proportional gain). As discussed above, this dynamic gain is applied in the linear control path as illustrated in FIGS. 3 and 4. An example of a scaling factor 92 is shown below in Formula 6:

$$\frac{1}{|1 - V_{O1}|} \quad \text{Formula 6}$$

Note that in Formula 6 if the scale factor signal $V_{O1}$ is zero, then the scaling factor 92 will be one and consequently no gain (i.e., a gain of 1) is applied by the DRDG control logic 46. As discussed above, the output of the damping ratio estimation loop 80 will converge to zero quickly when the oscillations will self-damp.

The scaling factor 92 will enable the controller 10 to selectively reduce the dynamic gain in response to self-damped oscillations or increase the dynamic gain for oscillations that will not self-damp.

Furthermore, note the value of the scale factor signal $V_{O1}$ can dynamically change depending on the oscillations in the input signal 30 and the characteristics, such as the duration and magnitude of the oscillations, in the damping ratio of the oscillations over time. In view of this, the DRDG control logic 46 enables a dynamic gain to be applied that can vary over time and be dependent on the oscillation characteristics of the input signal 30.

Returning to FIGS. 5 and 6, the dynamic limits of the dynamic limiter 86 will now be discussed. To control these dynamic limits, the DRDG control logic 46 includes a dynamic limit setter 94. The dynamic limit setter 94 includes oscillation magnitude threshold 96, a first delay 98, two multipliers 28, and two lag compensators 100 (a sixth lag compensator 100). As noted above, the dynamic limits of the dynamic limiter 86 are opened and closed based on whether the output of the integrator 76 within the integrator feedback loop 72 is above a threshold value for a defined period time.

As seen in FIGS. 5 and 6, the output of the integrator feedback loop 72 is also fed into the oscillation magnitude threshold 96 ($X_{d11}$) of the dynamic limit setter 94. When the output of the integrator feedback loop 72 is greater than the oscillation magnitude threshold 96 (shown as $X_{d11}$), a signal is output to the first delay 98.

The first delay 98 outputs a signal after it receives an input for sustained period of time $T_{d14}$. When the first delay 98 receives an input for the sustained period of time, the first delay 98 will output a logical one to the two multipliers 28 of the dynamic limit setter 94, which opens the dynamic limits of the dynamic limiter 86.

In particular, a first multiplier 28 of the two multipliers 28 applies the maximum value (Limit Max) of the dynamic limiter 86, and a second multiplier 28 of the two multipliers 28 applies a minimum value (Limit Min) of the dynamic limiter 86. As examples, the maximum value of the dynamic limiter 86 can be of value that is greater than, or equal to, zero and less than, or equal to, 0.99 (i.e., 0≤Limit Max≤0.99). The minimum value of the dynamic limiter 86 can be of value less than, or equal to, zero (i.e., Limit Min≤0). The output of the two multipliers 28 of the dynamic limit setter 94 feed into two lag compensators 100. The two lag compensators 100 have a respective time constant $T_{d15}$, $T_{d16}$ for the upper and lower range of the DRDG control logic 46.

When the dynamic limits of the dynamic limiter 86 are open, the output of the damping ratio estimation loop 80 is limited by the dynamic limiter 86 and subsequently passed to the fifth lag compensator 88 and the fourth proportional gain 90. Afterwards, scaling factor 92 can be determined and applied to the output of the error scaler 38 in the main control path.

Returning to FIGS. 3 and 4, after the dynamic gain is applied by the DRDG control logic 46, the signal having the dynamic gain is passed to the first proportional gain 48 in preparation for the first deadband 50. Note that in FIGS. 3 and 4 a DRDG control logic 46 is located in each separate branch of the linear control path (i.e., the first branch and the second branch). Hence, a dynamic gain can be independently determined by the DRDG control logic 46 for each one of the one or more input signals 30.

After the one or more input signals 30 received the dynamic gains in each branch, the control signal will eventually pass to the output limiter 62. As noted above, the output limiter 62 also includes dynamic limits. The dynamic limits of the output limiter 62 are openable and closable by the pulse counter logic 64. The pulse counter logic 64 controls the dynamic limits of the output limiter 62 based on the detection of excessive or prolonged pulses (rising edge in the positive direction or the negative direction, deviating from zero) in the signal at this point in the linear control path.

With this control of the output limiter 62, the controller 10 can flag a device operator (user) that an unexpected response is being produced by the controller 10. In addition, this control prevents the controller 10 from providing a control signal to the power electronic device that could damage or destabilize the power electronic device or the utility grid 2.

In particular, this feature allows the dynamic limits of the output limiter 62, and the controller 10 as a whole, to be controlled depending on whether the pulse count limit set by the device operator has been reached and/or whether the controller 10 continues to observe pulse occurrences for specified period of time. Thus, this feature increases the security of the system and method by effectively disabling the controller 10 when it experiences an unintended operation.

The logic circuitry of the pulse counter logic 64 is shown in FIGS. 7 and 8. The output limiter 62 is normally open until it is closed by the pulse counter logic 64. The pulse counter logic 64 includes an impulse detector 102, a counter 104, an initial pulse detector 106, a maximum pulse detector 108, one or more edge detectors 110a, 110b, 110c, one or more AND gates 24a, 24b, 24c, one or more OR gates 112a, 112b, one or more delays 114a, 114b (a second delay), a resetter 116, an output limit setter 118, and one or more NOT gates 120a, 120b, 120c, 120d.

In general, the pulse counter logic 64 performs three functions. First, after each pulse occurs in the control signal, the pulse counter logic 64 will reset the counter 104 if no additional pulses occur within a predetermined period of time. Second, after the first pulse, the pulse counter logic 64 will close the dynamic limits of the output limiter 62 for a temporary period of time if the counter 104 reaches a predetermined limit (maximum count) within a predetermined period of time. This feature also prevents the controller 10 from providing a sustained response to higher frequency power oscillations than the controller 10 above the designed response range of the controller 10.

Third, after the first pulse, the pulse counter logic 64 will close the dynamic limits of the output limiter 62 for a temporary period of time if the pulse count is not reached within the predetermined period of time and the pulses, nevertheless, continue to occur. This feature prevents the controller 10 from providing a sustained response to lower frequency oscillations than the controller 10 below the designed response range of the controller 10.

The circuit configuration of the pulse counter logic 64 and the functional operation of the pulse counter logic 64 will be discussed based on FIGS. 7 and 8. Starting with the circuit configuration, the pulse counter logic 64 includes an impulse detector 102 that receives an input from the output limiter 62. The output of the impulse detector 102 is connected to an input of a counter 104. The counter 104 is connected to an initial pulse detector 106 and a maximum pulse detector 108. The counter 104 will increment up to a maximum value (shown as "C" in FIGS. 7 and 8). The counter 104 also includes a reset input that is connected to a resetter 116. The resetter 116 includes a first OR gate 112a having an output connected to the reset input of the counter 104.

The initial pulse detector 106 has an output connected to a first delay 114a and a second edge detector 110b. The first edge detector 110a has an input connected to an output of the impulse detector 102 and an output connected to an input of a first NOT gate 120a. The first NOT gate 120a has an output connected to a first input of a first AND gate 24a. The first AND gate 24a has a second input connected to the output of the first delay 114a. The output of the first AND gate 24a is connected to a first input of the first OR gate 112a of the resetter 116.

The second edge detector 110b has an output connected to an input of a second NOT gate 120b. The output of the second NOT gate 120b is connected to an input of a second AND gate 24b. The second AND gate 24b has a first input connected to the first delay 114a and a second input connected to the second NOT gate 120b. The output of the second AND gate 24b is connected to an input of a third AND gate 24c.

The third AND gate 24c has a first input connected to a third NOT gate 120c and a second input connected to the second AND gate 24b. The third NOT gate 120c has an input connected to the first AND gate 24a. The third AND gate 24c has an output connected to a first input of a second OR gate 112b. The second OR gate 112b has a first input connected to the third AND gate 24c and a second input connected to an output of a fourth AND gate 24d. The fourth AND gate 24d has a first input connected to the output of the second edge detector 110b and the second input connected to the output of the maximum pulse detector 108. The second OR gate 112b has an output connected to an input of a third edge detector 110c.

The third edge detector 110c has an output that is connected to a second delay 114b and the output limit setter 118. The second delay 114b has an output connected to a second input of the first OR gate 112a of the resetter 116.

The output limit setter 118 includes a fourth NOT gate 120d. The fourth NOT gate 120d has an input connected to the output of the third edge detector 110c and an output connected to two multipliers 28a, 28b. The two multipliers 28a, 28b are each connected to a seventh lag compensator 122a, 122b. Each seventh lag compensator 122a, 122b is connected to feed the minimum and maximum dynamic limits to the output limiter 62.

The operation of the pulse counter logic 64 will now be discussed. The input of the pulse counter logic 64 is fed into an impulse detector 102. When an impulse is detected by the impulse detector 102, the impulse detector 102 will output a logical one to the counter 104 and the first edge detector 110a.

The first edge detector 110a will output a logical one for a hold time $T_{C1}$, which represents a status hold time to reset the counter 104 for an infrequent pulse detection. The logical one output by the first edge detector 110a is received by a first NOT gate 120a for the duration of the hold time $T_{C1}$. The first NOT gate 120a will invert the logical one into a logical zero and pass the logical zero to a first terminal of the first AND gate 24a.

The counter 104 will increment in response to receiving logical one from the impulse detector 102. Each time the counter 104 is incremented, the counter 104 will output an incremented multiple of logical one to the initial pulse detector 106 and the maximum pulse detector 108. When the initial pulse detector 106 receives an input greater than zero, initial pulse detector 106 will output a logical one to the first delay 114a. The first delay 114a will wait by a predetermined waiting period $T_{C2}$ before outputting a logical one. The predetermined waiting period $T_{C2}$ prevents an intermediate pulse count reset of the counter 104 from occurring.

After the predetermined waiting period $T_{C2}$, the first delay 114a will output a logical one to a second input of the first AND gate 24a. After receiving a logical one in both of its inputs, the first AND gate 24a will output a logical one to the resetter 116. The resetter 116 includes a first OR gate 112a. In response to receiving a single logical one, the first OR gate 112a will output logical one to a reset input of the counter 104. This will reset the counter 104.

The initial pulse detector 106 will also output a signal to the second edge detector 110b. The second edge detector 110b will output a logical one for the duration of a predetermined time period $T_{C3}$, which is a time window for the pulse count to be reached, or the oscillations cease, after the first pulse has been detected. The logical one output by the second edge detector 110b is received by a second NOT gate 120b.

The second NOT gate 120b outputs a logical one to one of the two inputs of a second AND gate 24b when it receives a logical zero from the second edge detector 110b. The other one of the two inputs of the second AND gate 24b receives a logical one from the output of the first delay 114a. When both of the two inputs of the second AND gate 24b receives a logical one, the second AND gate 24b outputs a logical one to the third AND gate 24c.

When the first and second inputs of the third AND gate 24c are a logical one, the third AND gate 24c will output a logical one to the second OR gate 112b. The second OR gate 112b outputs a logical one to a third edge detector 110c, which outputs a logical one for a holding time $T_{C4}$. The holding time ($T_{C4}$) of the third edge detector 110c provides a time period for closing the limits of the output limiter 62 (and thus the response of the controller 10).

The output of the third edge detector 110c is passed to the output limit setter 118 and the second delay 114b. The second delay 114b will output a logical one after a delay period $T_{C5}$, which provides a time delay prior to resetting the counter 104 and opening the dynamic limits of the output limiter 62. The second delay 114b is connected to a second input of the first OR gate 112a, which outputs a reset signal to the reset input of the counter 104.

During the holding time $T_{C4}$, the third edge detector 110c output the logical one to the output limit setter 118. When the fourth NOT gate 120d receives a logical one, the fourth NOT gate 120d will invert the logical one into a logical zero, which closes the dynamic limits of output limiter 62.

When the fourth NOT gate 120d receives a logical zero, the fourth NOT gate 120d will invert the logical zero into a logical one. The two multipliers 28a, 28b of the output limit setter 118 will multiply the logical one by a maximum value $E_{MAX}$ of the output limiter 62 and a minimum value $E_{MIN}$ of the output limiter 62. The maximum value $E_{MAX}$ can be any value greater than, or equal to, zero. The minimum value $E_{MIN}$ can be any value less than, or equal to, zero. The dynamic limits output by the two multipliers 28a, 28b are then fed through the two lag compensators 122a, 122b, which set the dynamic limits of the output limiter 62. The seventh lag compensators 122a, 122b each have time constants $T_{C6}$, $T_{C7}$ that are for the lower and upper range of the output limiter 62.

Furthermore, the counter 104 will count up to a maximum pulse count (shown as "C" in FIGS. 7 and 8). The counter 104 outputs the pulse count to the maximum pulse detector 108. When the maximum pulse count is reached (e.g., pulse count >C−1), the maximum pulse detector 108 outputs a logical one to the fourth AND gate 24d.

When both of the two inputs of the fourth AND gate 24d are a logical one, the fourth AND gate 24d outputs a logical one to the second OR gate 112b. The second OR gate 112b will output a logical one when only one of its two inputs is a logical one. The output of the second OR gate 112b is received by the third edge detector 110c. The third edge detector 110c will again follow the operation discussed above with respect to the second delay 114b and the resetter 116 as well as to the output limit setter 118.

With the above logic circuit configuration and functional operation of the pulse counter logic 64, the pulse counter logic 64 can close the normally open dynamic limits of the output limiter 62. This allows the pulse counter logic 64 to selectively stop the operation of the controller 10 (i.e., the linear control path in FIGS. 3 and 4) in the event that an excessive output pulse frequency, or a sustained excess number of pulses, occurs.

FIGS. 9-16 provide flowcharts that further demonstrate the system and method of the present disclosure discussed above with respect to the logic circuit diagrams of the controller 10.

Figure 9:
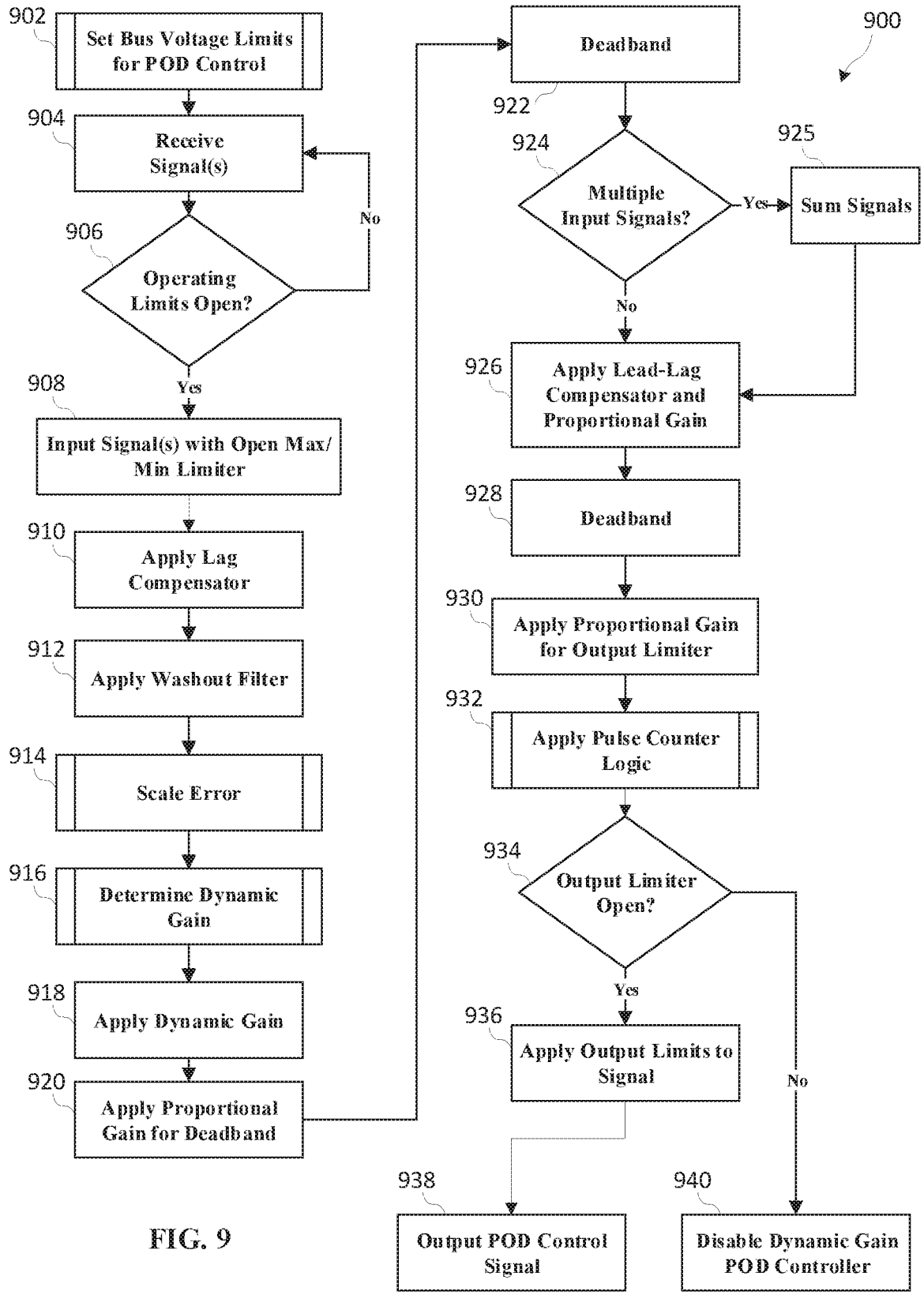
FIG. 9 is a flowchart showing the process for the logic circuit diagrams in FIG. 3-8 according to the disclosed embodiments.
Figure 10:
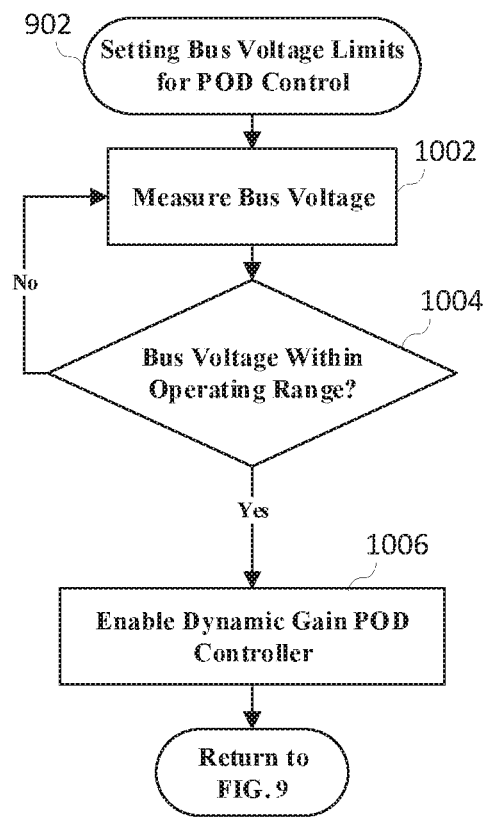
FIG. 10 is a flowchart showing further details of one of the steps in the flowchart of FIG. 9 according to disclosed embodiments.
Figure 11:
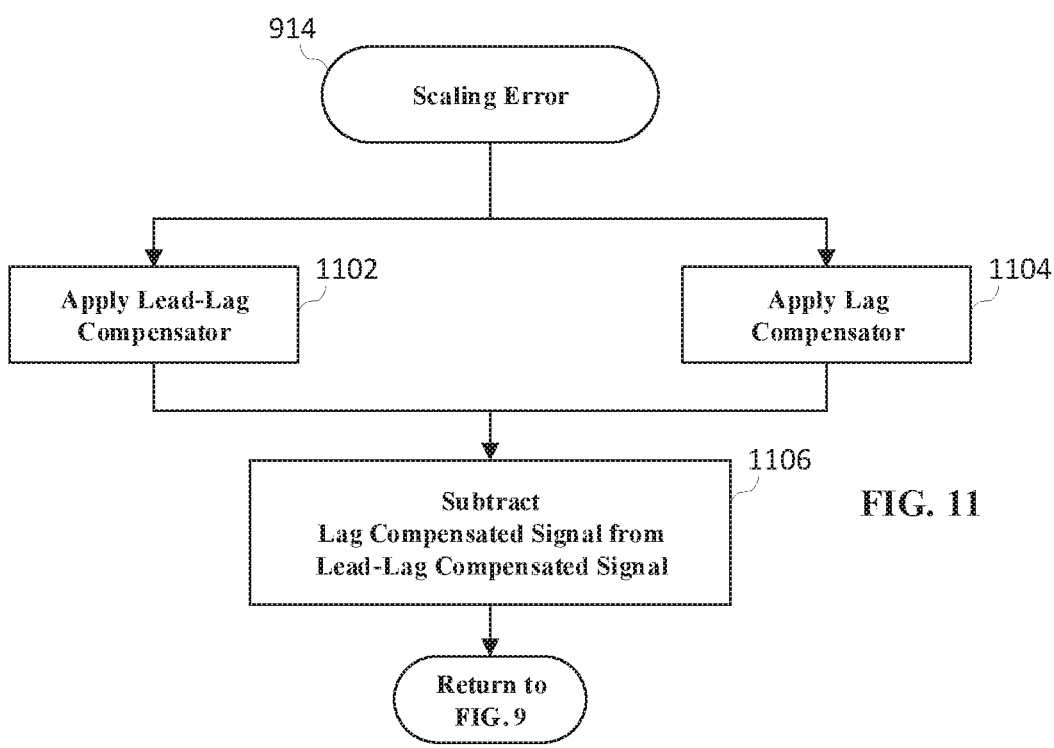
FIG. 11 is a flowchart showing further details of one of the steps in the flowchart of FIG. 9 according to disclosed embodiments.
Figure 12:
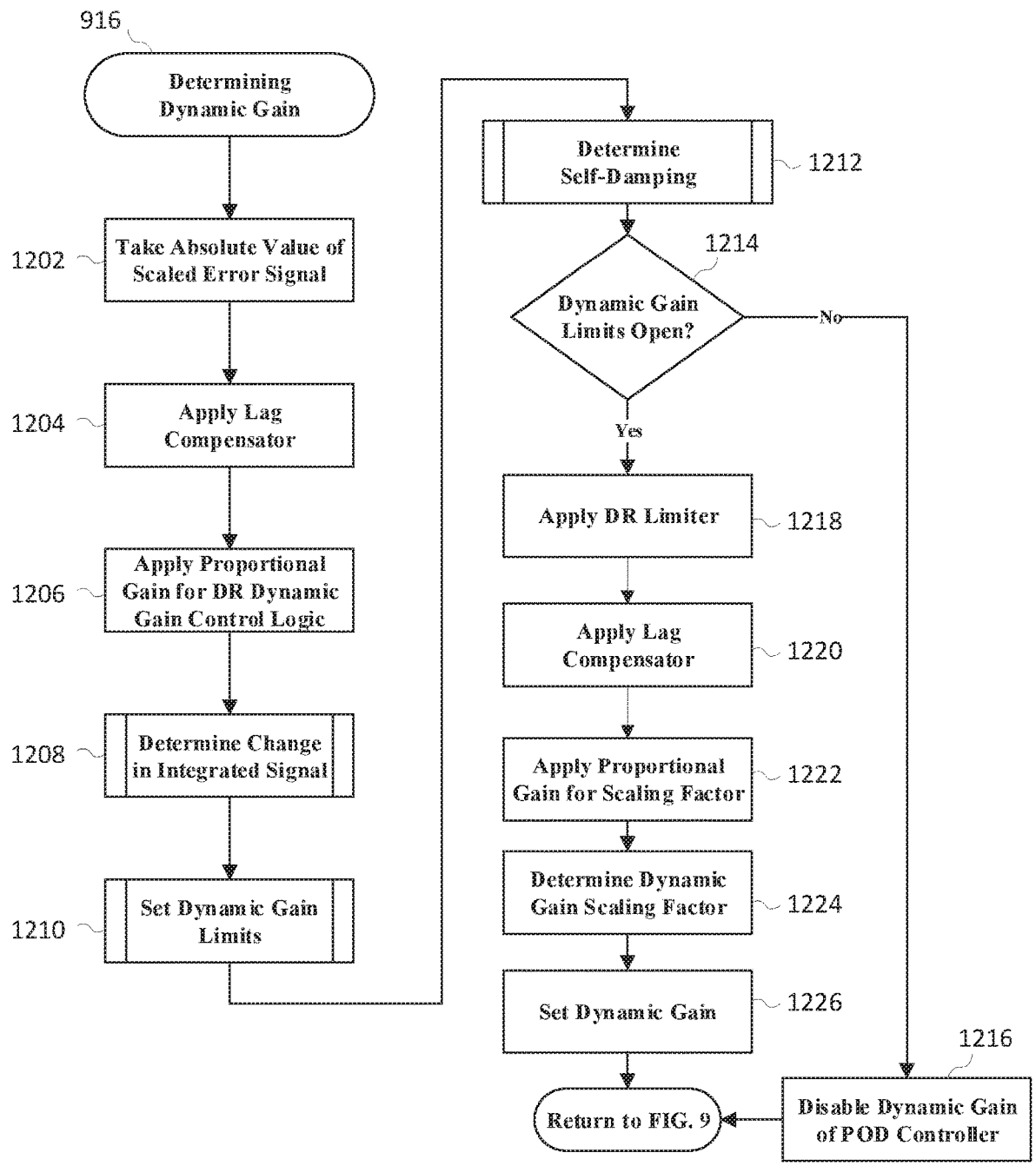
FIG. 12 is a flowchart showing further details of determining the dynamic gain in the flowchart of FIG. 9 according to disclosed embodiments.

FIG. 9 shows a flowchart 900 that corresponds to the linear control path shown in FIGS. 3 and 4. FIGS. 10-16 provide greater details of the steps in the flowchart 900 of FIG. 9. FIG. 12 corresponds to the DRDG control logic 46 shown in FIGS. 5 and 6. FIG. 16 corresponds to the pulse counter logic shown in FIGS. 7 and 8.

In FIG. 9, the flowchart 900 includes a step 902 of setting the bus voltage limits for the power oscillation damper control. The setting of the bus voltage limits for the POD control in step 902 is shown in detail in FIG. 10. In FIG. 10, the method includes the step 1002 of measuring the bus voltage. This measurement is performed by the sensors 8 connected to the controller 10 as shown in FIG. 2. Recall that the sensors 8 are connected to the power electronic devices and the utility grid 2 in FIG. 1.

FIG. 10 shows us a step 1004 in which the controller 10 determines whether the bus voltage is within the continuous operating range. An example of this determination can be seen in FIGS. 3 and 4, which shows the bus voltage 16 is fed to the bus voltage range determiner 18. The bus voltage range determiner 18 includes an upper bus voltage range 20 and a lower bus voltage range 22. When the bus voltage 16 satisfies both the upper bus voltage range 20 and the lower bus voltage range 22, the two inputs of the AND gate 24 will both be a logical one in the AND gate 24 will output a logical one to signify that the bus voltage 16 is within the continuous range.

Returning to FIG. 10, in step 1004, when it is determined that the bus voltage is not within the continuous operating range (step 1004=NO), the process returns to step 1002 in order to continue measuring the bus voltage 16. When the controller 10 determines that the bus voltage 16 is within the continuous operating range (step 1004=YES), the flowchart proceeds to step 1006 in which the controller 10 is enabled for power oscillation damping control.

By enabling the damping ratio dynamic gain control of the controller 10, this means that the dynamic limits of the input limiter 32 are opened. Returning to FIGS. 3 and 4, when the bus voltage 16 is within the continuous operating range of the bus voltage range determiner 18 will open the dynamic limits of the input limiter 32 via the signal sent through the input dynamic limit determiner 26. Thus, since further processing can occur along the linear control path, the controller 10 is considered to be enabled for the power oscillation damping control.

In FIG. 9, the flowchart 900 includes a step 904 in which the one or more input signals 30 are received. Recall that the number of input signals 30 is not particularly limited. For example, there may only be one input signal 30 or there may be more than one input signal 30 (e.g., two input signals 30, three input signals 30, etc.). The number of branches in the linear control path shown in FIGS. 3 and 4 before the multiple-input-signal summer 52 is dependent upon the number of input signals 30. Furthermore, the input signal 30 can be, for example, the active component of the line current, the branch power, or the node voltage local to any power electronic device in the utility grid 2.

The flowchart 900 includes a step 906 in which the controller 10 determines whether the dynamic limits of the input limiter 32 are open. If the dynamic limits of the input limiter 32 are not open (step 906=NO), the process returns to step 904. If the dynamic limits of the input limiter 32 are open (step 906=YES), the process continues to step 908. In step 908, the one or more input signals 30 are passed through the input limiter 32 to proceed for further processing.

Next, the flowchart 900 proceeds to step 910 in which the first lag compensator 34 is applied to the one or more input signals 30. Recall that the first lag compensator 34 has a time constant $T_{11}$, $T_{12}$ for each of the one or more input signals 30. After the first lag compensator 34 is applied, a POD control signal is produced (or a branch control signal if multiple input signals 30), and the process proceeds to step 912 in which the washout filter 36 is applied to the signal. The washout filter 36 is a stable high-pass filter with zero static gain. The washout filter 36 eliminates a steady-state offset that may occur from the input signal 30 and filters out low-frequency noise, and the washout filter 36 has a time constant $T_{12}$, $T_{21}$ for each of the one or more input signals 30.

After the DC offset has been removed, the process proceeds to step 914 in which the error of the signal is scaled (difference is taken) as similarly shown in the error scaler 38 of FIGS. 3 and 4. The details of step 914 and the scaling of the error signal is shown in FIG. 11. In FIG. 11, the first lead-lag compensator 40 is applied to the signal in step 1102 and the second lag compensator 42 is applied to the signal in step 1104.

After the first lead-lag compensator 40 and the second lag compensator 42 are applied in step 1102 and step 1104, the lag compensated signal provided by step 1104 is subtracted from the lead-lag compensated signal provided by step 1102. This can be seen, as another example, in FIGS. 3 and 4 where the output of the first lead-lag compensator 40 is fed into the positive input of the first summer 44 and the output of the second lag compensator 42 is fed into the negative input of the first summer 44. Thereafter, the process proceeds back to FIG. 9.

Step 914 in FIG. 11 will amplify the higher magnitude variations in the control signal and reduce the low magnitude variations in the control signal after step 912, which applies the washout filter 36. For example, low magnitude variations in the control signal will be reduced in step 1106, and the high magnitude variations in the control signal will be increased in step 1106.

After the error is scaled in step 914, the process proceeds to step 916 in which the dynamic gain is determined. The details of the determination in step 916 are shown in FIG. 12. In FIG. 12, the controller 10 in step 1202 takes the absolute value of the error scaled signal, which is provided by step 914. Step 1202 is analogous to the absolute value block 66 shown in FIGS. 5 and 6. The absolute value taken in step 1202 is in preparation for the integration that will be used in determining the dynamic gain.

Recall that taking the integration of a sine wave centered around the time axis (i.e., the horizontal or y-axis) will result in zero since there is an equal number of positive components and negative components in the sine wave. On the other hand, in step 1202, the absolute value of the one or more control signals in this point in the process of flowchart 900 has been taken. Consequently, all of the magnitude components of the one or more input signals will be positive. Thus, the integration will not result in zero.

Furthermore, since the washout filter 36 removes the DC offset that may occur in the one or more input signals 30 in step 912, the absolute value and the integration will be more representative of the oscillation characteristics of the one or more input signals 30. This is because if the absolute value was taken for a signal that had a positive DC offset, or a negative DC offset, (i.e., a signal not centered around the time axis), the absolute value would be skewed based on the positive or negative DC offset of the one or more input signals 30.

Returning to FIG. 12, after the absolute value taken in step 1202, the process proceeds to step 1204. In step 1204, a third lag compensator 68 is applied to the absolute value of the signal. The transfer function of third lag compensator 68 has a time constant $T_{d11}$ for the dynamic gain determination of step 916. Next, the process proceeds to step 1206 in which the third proportional gain 70 is applied to one or more control signals at this point in the process. The third proportional gain 70 has a proportional gain $K_{d11}$ set for the DRDG control logic 46.

Figure 13:
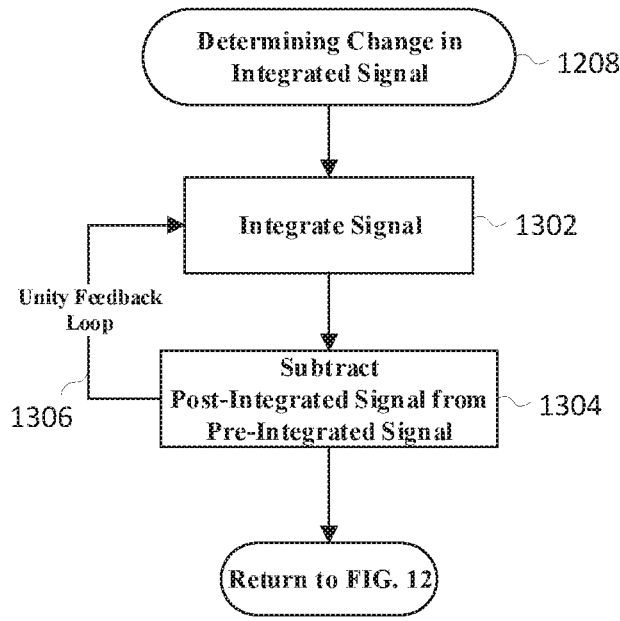
FIG. 13 is a flowchart showing further details of one of the steps in the flowchart of FIG. 12 according to disclosed embodiments.

After the proportional gain $K_{d11}$ is applied to the signal, the integration occurs as well as a determination of the change that occurs in the integrated signal in step 1208. The details of the integration and the associated determination is shown in FIG. 13. In FIG. 13, the signal is integrated in step 1302. The output of the integration is subtracted from the signal before it has been integrated in step 1304. Then the output of this difference is fed back to step 1302 for further integration by a unity feedback loop in step 1306. The process shown in FIG. 13 is analogous to the integrator feedback loop 72 as shown in FIGS. 5 and 6.

For the manner of integration performed in step 1302, the integration can be performed by summation of all of the components of the signal. In other words, the area under the curve is determined by summation of all the components of the signal.

As discussed above, the integration of the absolute value of the sinusoidal signal will have a non-linearly increasing value that includes the arithmetic sum of all the prior areas under the curve oscillation. This non-linearly increasing value will be indicative of the oscillation characteristics of the one or more input signals 30 and allows a dynamic gain to be determined therefrom.

In particular, the feedback shown in the process of FIG. 13 provides a basic feedback magnitude that will develop at a rate dependent upon the magnitude of the oscillations according to the integrator output. This will cause the output of the integration in step 1302 to be greater than the signal in which the third proportional gain 70 is applied in step 1206, fed back from the unity feedback loop in step 1306 when the oscillation is damping. This forces the error into the integrator in step 1302 to be negative until the oscillation is either eliminated, sustained, or subsequently gross.

If the oscillation is eliminated in the process shown in FIG. 13, then the input error (i.e., the result of the subtraction in step 1304) that returns to the integration in step 1302 will converge to zero in a steady state. Furthermore, the output of the integration in step 1302 will be zero when the oscillation eliminates itself. Hence the process shown in FIG. 13 in combination with the previously discussed steps will provide selectivity to the actions of the controller 10 since input signals 30 having oscillations that will self-damp will not be acted upon and allowed to pass unchanged by the DRDG control logic 46. In particular, the output of the integrator 76 for self-damped signals will converge to zero (as these signals are being damped). This means that quickly damping signals will quickly converge to zero.

Self-damped waveforms may also have a negative error that forces the damping ratio dynamic gain of the DRDG control logic 46 to be less than 1. When this occurs, this will reduces the response of the POD control. On the other hand, growing oscillations generally have a positive error from the integrator 76 and will therefore amplify the POD control response of the DRDG control logic 46.

In other types of oscillations, the output of the integration in step 1302 will not converge to zero. For example, for sustained marginally stable oscillations, the output of the integration in step 1302 will converge to a constant magnitude (i.e., a non-zero constant magnitude). This constant magnitude will later be used to determine the dynamic gain.

Furthermore, for growing and undamped oscillations, the output of the integration in step 1302 after the unity feedback loop in step 1306 will progressively increase. Because of this, the output of the integration performed in 1302 will continuously grow. This allows a dynamic gain to have a time varying characteristic that is representative of the oscillations in the one or more input signals 30.

In addition, the process shown in FIG. 13 along with the other features of the process enables the output of the integrator in step 1302 to characterize the motion, or manner, in which the oscillations occur in the utility grid 2 in response to an event or a disturbance. This also allows the output of the integrator in step 1302 to characterize the level of damping in the utility grid 2 and the power electronic devices contained in the utility grid 2.

Returning to FIG. 12, after the change in the integration is determined in step 1208 to characterize the oscillations, the process proceeds to step 1210 in which the dynamic limits of the dynamic limiter 86 within the DRDG control logic 46 are set. The dynamic limiter 86 can be seen by way of example in FIGS. 5 and 6. The details of step 1210 for setting the dynamic limits of the dynamic limiter 86 are shown in FIG. 15.

Figure 15:
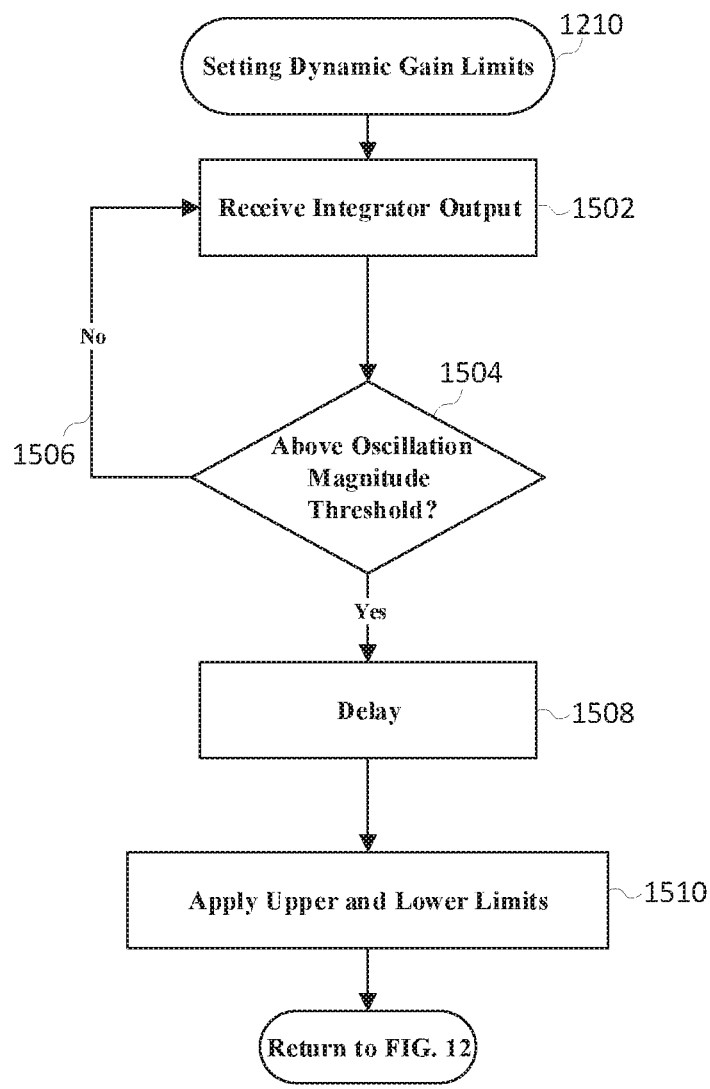
FIG. 15 is a flowchart showing further details of one of the steps in the flowchart of FIG. 12 according to disclosed embodiments.
Figure 16:
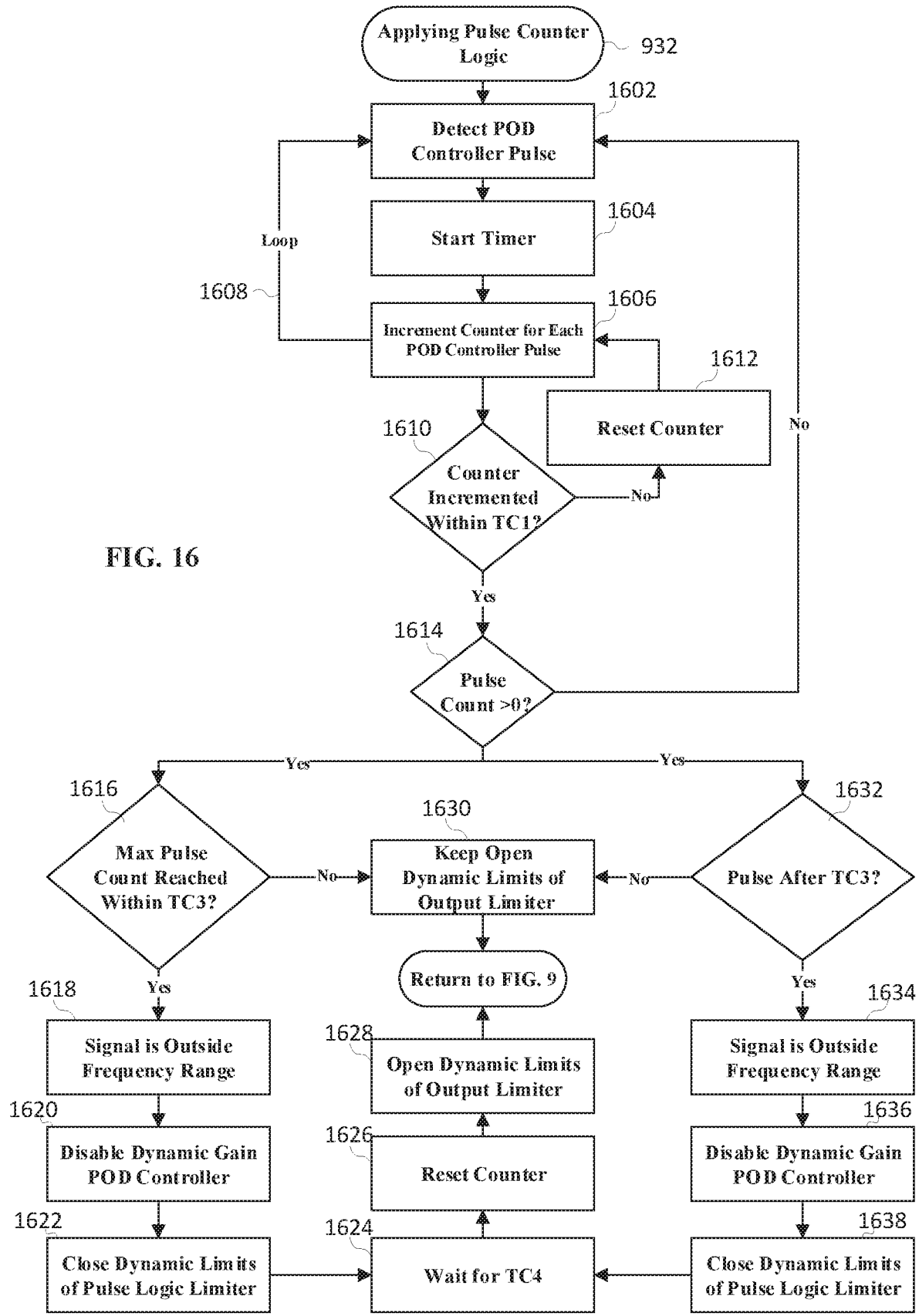
FIG. 16 is a flowchart showing further details of applying the pulse counter logic in the flowchart of FIG. 9 according to disclosed embodiments.

The process in FIG. 15 includes a step 1502 in which the output of the integration (i.e., the output of the process in FIG. 13) is received. Next, the process includes step 1504 in which a determination is made whether the oscillation magnitude is above the oscillation magnitude threshold 96. The oscillation magnitude threshold 96 sets a predetermined value ($X_{d11}$) for the types of oscillations that the controller 10 will respond to in the one or more input signals 30.

If this magnitude is not above the oscillation magnitude threshold 96 (step 1504=NO), the process will return to step 1502 via the return loop 1506. This continues the process for other signals with oscillations above the oscillation magnitude threshold 96. If the magnitude is above the oscillation magnitude threshold 96 (step 1504=YES), then the output of step 1504 proceeds to step 1508. In step 1508, after the magnitude is above the oscillation magnitude threshold for a predetermined period of time $T_{d14}$, the dynamic limits of the dynamic limiter 86 of the DRDG control logic 46 open. With this output in step 1508, the upper and lower dynamic limits of the dynamic limiter 86 are applied in step 1510 and the process returns to FIG. 12.

Figure 14:
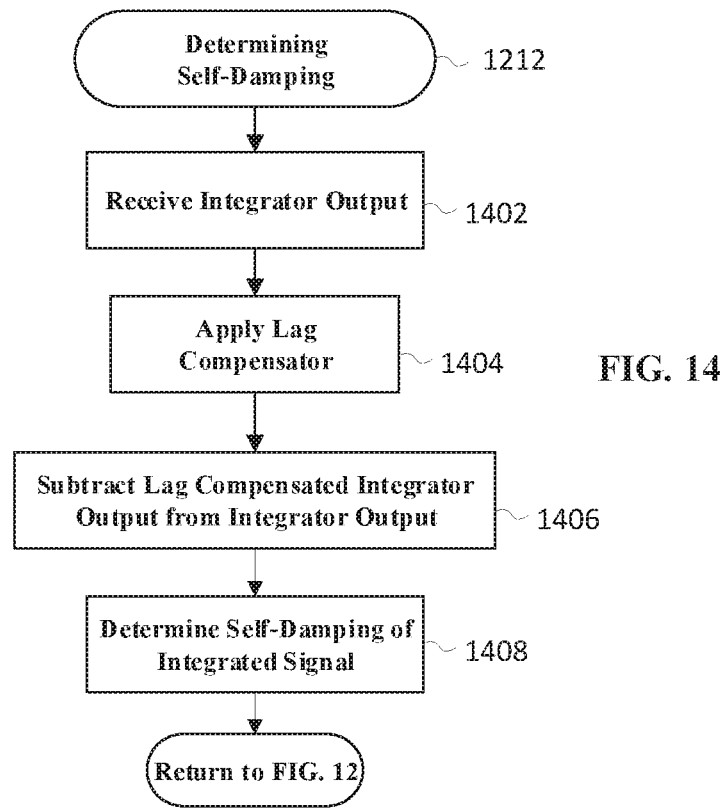
FIG. 14 is a flowchart showing further details of one of the steps in the flowchart of FIG. 12 according to disclosed embodiments.

In FIG. 12, after the dynamic limits of the dynamic limiter 86 are set in step 1210, the process proceeds to step 1212 in which a determination is made regarding the self-damping of the oscillations in the one or more input signals 30. The details of step 1212 are shown in FIG. 14. Furthermore, the process of the determination of the self-damping in step 1212 and FIG. 14 are analogous to the damping ratio estimation loop 80 as shown in FIGS. 5 and 6.

In FIG. 14, the process in step 1402 receives the output of the integration that was performed in FIG. 13 (i.e., steps 1302, 1304, 1306). After the result of the integration has been received in step 1402, a fourth lag compensator 82 is applied to the integrated result in step 1404. The transfer function of the fourth lag compensator 82 has a time constant $T_{d13}$ for the damping ratio estimation within the DRDG control logic 46.

Next, the process in FIG. 14 proceeds to step 1406 in which the lag compensated integrator output from step 1404 is subtracted from the integrator output received in step 1402. Subsequently, the process in FIG. 14 proceeds to step 1408 in which a determination is made regarding the self-damping of the integrated signal. As noted above, the result of the process shown in FIG. 13 characterizes the level damping of the oscillations in the one or more input signals. On the other hand, the result of FIG. 14 (i.e., determination in step 1408) represents the rate of change of damping that occurs with respect to time associated with the decay rate. This is commonly referred to as the damping ratio.

After the determination of the damping ratio in step 1212 of the FIG. 14 is performed, the process returns to FIG. 12. In FIG. 12, the next step is step 1214 in which a determination is made whether the dynamic limits of the dynamic limiter 86 within the DRDG control logic 46 are open. If the dynamic limits of the dynamic limiter 86 are not open (step 1214=NO), the process proceeds to step 1216 in which the damping ratio dynamic gain control logic is disabled, setting the damping ratio dynamic gain value to one. If the dynamic limits of the dynamic limiter 86 are open (step 1214=YES), the process proceeds to step 1218.

When the dynamic limits of the dynamic limiter 86 are to be closed (step 1214=NO) and the controller 10 is to be disabled in step 1216 (due to the output of the integration in step 1302), this means that the controller 10 will not apply the DRDG control logic 46 (i.e., the dynamic gain). In other words, the DRDG control logic 46 being "disabled" in step 1216 does not mean that the controller 10 itself does not perform any other control functions or produce any control signals. Instead, this means that the controller 10 can continue its POD control signal response without being adjusted by the DRDG control logic 46.

In step 1218, the dynamic limits of the dynamic limiter 86 are applied to the input signal. After the dynamic limiter is applied, the process proceeds to step 1220 in which a fifth lag compensator 88 is applied to the signal. The fifth lag compensator 88 has a time constant $T_{d17}$ set for outputting the signal from the DRDG control logic 46. The process in FIG. 12 proceeds to step 1222 in which a fourth proportional gain 90 is applied to the signal in preparation for output from the DRDG control logic 46. This provides a scaling factor signal $V_{O1}$ that is used to determine the dynamic gain, as discussed above with respect to FIGS. 5 and 6.

With the scaling factor signal $V_{O1}$, a determination is made of the dynamic gain scaling factor in step 1224. An example of computation performed for the scaling factor 92 is shown in Formula 6 and FIGS. 5 and 6. After the scaling factor 92 is determined the dynamic gain is set in step 1226 and the process returns to FIG. 9.

In the flowchart 900 of FIG. 9, after the dynamic game has been determined in step 916, the process proceeds to step 918 in which the dynamic gain is applied to the signal for which the error was scaled in step 914. After the dynamic gain is applied in step 918, the first proportional gain 48 having a proportional gain $K_{12}$, $K_{22}$ for each of the one or more input signals 30 is applied to the signal in order to prepare the signal for entry into the first deadband 50.

The process then proceeds to step 922 in which each of the one or more branch control signals is passed through the first deadband 50. The first deadband 50 provides further selectivity to the types of signals that will be modified by the controller 10, as discussed above. After passing through the first deadband 50, the process proceeds to step 924 in which a determination is made whether there are multiple input signals 30.

If it is determined in step 924 that there are multiple input signals (step 924=YES), then the process proceeds to step 925 in which the one or more branch control signals at this point in the linear control path are combined to form a POD control signal by a multiple-input-signal summer 52. If it is determined in step 924 that there is only one input signal 30 (step 924=NO), then the process proceeds to step 926.

In step 926, one or more lead-lag compensators and one or more proportional gains are applied to the signal in preparation for the second deadband 58. For example, FIGS. 3 and 4 show the signal being applied with the second lead-lag compensator 54 and the third lead-lag compensator 56, which each have a proportional gain $K_{S1}$, $K_{S2}$ (as shown in the transfer functions). After the one or more lead-lag compensators and the one or more proportional gains are applied to the signal in step 926, the signals are passed through the second deadband 58 in step 928.

After passing through the second deadband 58 in step 928, the process proceeds to step 930 in which the second proportional gain 60 having the proportional gain $K_{S3}$ is applied to the POD control signal. The proportional gain $K_{S3}$ of the second proportional gain 60 prepares the POD control signal for being passed into the output limiter 62.

The process in the flowchart 900 of FIG. 9 then proceeds to step 932 in which the pulse counter logic 64 is applied to determine whether the dynamic limits of the output limiter 62 should be opened or closed. The details of step 932 is shown in FIG. 16. Step 932 and FIG. 16 is analogous to the logic circuit diagrams of FIGS. 7 and 8.

In applying the pulse counter logic in step 932, FIG. 16 shows that the process includes a step 1602 in which an impulse in the POD control signal is detected. This is analogous to the impulse detector 102 in FIGS. 7 and 8. When an impulse is detected in step 1602, a timer started in step 1604. The timer is a function of the controller 10 to measure time, as can be seen in the various time periods in FIGS. 7 and 8. In addition, the process in FIG. 16 increments the counter 104 in step 1606. At this point, the process in FIG. 16, which represents the pulse counter logic 64 returns back to step 1602 via a return loop 1608 to allow further detection of pulses in the control signal. Consequently, the timer is reset (restarted) in step 1604 each time an impulse is detected.

After the counter 104 is incremented in step 1606, the process proceeds to step 1610 in which it is determined whether the counter 104 has been incremented within a period of time $T_{C1}$. The predetermined period of time $T_{C1}$ is a status hold time that determines when the counter 104 should be reset. If the counter 104 is not incremented within the predetermined period of time $T_{C1}$ (step 1610=NO), then the process proceeds to step 1612 in which the counter 104 is reset. After the counter 104 is reset in step 1612, the process returns to step 1606 in which the counter 104 will again be incremented each time a pulse is detected.

If the counter 104 is incremented within the predetermined period of time $T_{C1}$ (step 1610=YES), then the process in FIG. 16 proceeds to step 1614. In step 1614, a determination is made whether the pulse count of the counter 104 is greater than zero. If the pulse count of the counter 104 is not greater than zero (step 1614=NO), then the process proceeds back to step 1602 in which pulses are detected. If the pulse count of the counter 104 is greater than zero in step 1614, then the process proceeds to two parallel paths to determine whether the dynamic limits of the output limiter 62 should be opened or closed.

First, the process proceeds to step 1616 in which the pulse counter logic 64 of the controller 10 determines whether the maximum pulse count ("C" in FIGS. 7 and 8) has been reached within a predetermined period of time $T_{C3}$. If the maximum pulse count of the POD control signal has been reached within the predetermined period of time $T_{C3}$ (step 1616=YES), then the controller 10 determines in step 1618 that the control signal is outside of the frequency range suitable for control.

By determining that the maximum pulse count has been reached within the predetermined period of time $T_{C3}$ (step 1616=YES), the process in FIG. 16 can prevent a sustained response to higher frequency power oscillations than the controller 10 is designed to handle. After determining that the signal is outside of the permitted frequency range for control, the process in FIG. 16 will disable the controller 10 (i.e., the power oscillation damping control of the controller 10) in step 1620 by closing the dynamic limits of the output limiter 62 in step 1622.

The dynamic limits of the output limiter 62 are only temporarily closed for a waiting period. In particular, FIG. 16 shows that the process will proceed to step 1624 in which a waiting period $T_{C4}$ occurs. After the waiting period $T_{C4}$ occurs in step 1624, the process proceeds to step 1626 in which the counter 104 is reset. Then the process proceeds to step 1628 in which the dynamic limits of the output limiter 62 are reopened in step 1628 (i.e., opened after being closed in step 1622).

On the other hand, in step 1616, if the counter 104 has not reached the maximum pulse count ("C" in FIGS. 7 and 8) within the predetermined period of time $T_{C3}$ (step 1616=NO), then the operation of the controller 10 should continue in the process and proceeds to step 1630 in which the dynamic limits of the output limiter 62 are kept open (i.e., not closed). Note that the dynamic limits of the output limiter 62 are normally open.

Second, returning to step 1614, when the pulse count is greater than zero the process also proceeds to step 1632 in addition to step 1616. In step 1632, a determination is made whether a pulse has been detected by the counter 104 after the predetermined period of time $T_{C3}$. If pulses continue to occur after the predetermined time period $T_{C3}$ (step 1632=YES) and within the predetermined time period $T_{C1}$ (step 1610=YES), this is indicative of an input signal 30 to the POD control that has a lower frequency than it is designed for and that the controller 10 is responding to this input signal 30 for a sustained period.

When the pulses continue to occur in step 1632 (step 1632=YES), the process proceeds to step 1634 in which the controller 10 determines that the control signal is outside of the permitted frequency range and the control performed by the controller 10 is disabled in step 1636 by closing the dynamic limits of the output limiter 62 in step 1638.

After the dynamic limits of the output limiter 62 are closed in step 1638, like step 1622, the dynamic limits of the output limiter 62 are closed for a temporary holding period. As shown in FIG. 16, the process proceeds to step 1624 where a waiting period $T_{C4}$ occurs. After waiting period $T_{C4}$, the process proceeds to step 1626 in which the counter 104 is reset and then proceeds to step 1628 in which the dynamic limits of the output limiter 62 are reopened (i.e., opened after being closed in step 1638).

As noted above, when the dynamic limits of the output limiter 62 are closed, this effectively disables the controller 10 by setting, for example, the control signal that would be output to the power electronic device to zero. Hence, the pulse counter control logic 64 as discussed in FIG. 16 prevents the controller 10 from operating in response to an excessive output pulse frequency or sustained pulses that could occur. This not only increases the selectivity of the system and method but also provides enhanced security since the controller 10 cannot perform a process that it is not designed, or safe, to perform for the utility grid 2 and/or the power electronic devices in the utility grid 2.

Returning to FIG. 9, the flowchart 900 after the pulse counter logic is applied in step 932 proceeds to step 934 in which it is determined whether the dynamic limits of the output limiter 62 are open. If the dynamic limits of the output limiter 62 are not open (step 934=NO), then the process proceeds to step 940 and the control performed by the controller 10 is disabled. If the dynamic limits of the output limiter 62 are open (step 934=YES), then the process proceeds to step 936. In step 936, the dynamic limits of the output limiter 62 are applied to the control signal, and the process proceeds to step 938 in which the control signal is finally output by the controller 10 to control the corresponding power electronic device.

Alternative embodiments will be briefly discussed with it being understood that any of the above embodiments can be modified and combined within the spirit of the present disclosure, as will be understood by one skilled in the art.

In FIGS. 3 and 4, multiple input signals 30 are shown and multiple branch paths are shown in the linear control path. As discussed above, there may be one or more input signals 30. In view of this, there may be only one branch path, or there may be more than one branch path in the linear control path depicted in FIGS. 3 and 4. The number of branches in the linear control path is based on the number of input signals 30.

The linear control path of FIGS. 3 and 4 show an error scaler 38, and the flowcharts show a step of scaling the error in step 914. However, in one or more embodiments, this function need not be included. That is, the signal may not be scaled in one or more embodiments. In this case, the result of the washout filter 36 may pass directly to the DRDG control logic for dynamic gain the determination.

The DRDG control logic in FIGS. 5 and 6 shows an example formula for the scaling factor 92 (i.e., Formula 6). However, the scaling factor 92 is not particularly limited to this formula.

The linear control path in FIGS. 3 and 4, as well as the process depicted in the flowcharts, includes proportional gains being separated from compensators and filters. As will be understood by one skilled in the art, the proportional gains could be included with the transfer functions of the compensators and filters. Similarly, any proportional gains that are shown in the transfer functions of the compensators and filters could also be provided separately in the programming of the controller 10.

The pulse counter logic in FIGS. 7 and 8 show specific logic gates. However, as will be understood by one skilled in the art, the logic gates could be implemented with any number of different types of logic gates. For example, logic gates could be entirely implemented with NAND gates. Any number, or combination, of logic gates may be used in one or more embodiments of the present disclosure.

In addition, the above disclosure discusses logical outputs as a logical one and a logical zero. However, these logical outputs could be implemented with any number of different logic circuit components. For example, logical one could be a high signal and the logical zero could be a low signal having a voltage lower than the high signal. In addition, the logical outputs could have intervening logic circuitry that could change the output so that the overall function of the logic is still achieved. For example, one of the logic circuit components could technically output a logical zero and an intervening NOT gate could invert the logical zero into a logical one before it is received by the next logic component.

The controller 10 discussed above may include one or more processors and memory. The controller 10 may be, or include, e.g., a microcontroller, a microcomputer, a programmable logic controller (PLC), an industrial computer, or a digital signal processor. The memory can include static memory (e.g., ROM, PROM, EPROM), dynamic memory (e.g., RAM, SRAM, DRAM), and/or hybrid memory (e.g., NVRAM, EEPROM, Flash) that holds information used by the controller 10. The memory of the controller 10 can include one or more programs for operating the components of the system and method, data used by the controller 10, and/or technical information used by the controller 10. In various embodiments, the memory of the controller 10 may include, or be, a flash drive, a solid-state drive, a magnetic or optical drive, or any suitable memory device.

The method of the present disclosure may be a computer-implemented method. Furthermore, the system and method may utilize one or more computer-readable storage media to implement embodiments consistent with the present disclosure. A computer-readable storage medium refers to any type of physical memory on which information or data readable by a processor can be stored. Computer-readable storage medium may store instructions for execution by one or more processors, including instructions for causing one or more of the processors to perform steps or stages consistent with the disclosed embodiments. The term "computer-readable medium" should be understood to include tangible items and exclude carrier waves and transient signals (i.e., be non-transitory).

This disclosure is intended to explain how to fashion and use various embodiments in accordance with, not limit, the true, intended, and fair scope and spirit thereof. The foregoing description is not intended to be exhaustive, or limited to, the precise form disclosed. Modifications or variations are possible in light of the above teachings. The embodiments above are chosen and described to provide illustration of the principles as practical applications, and to enable one of ordinary skill in the art to utilize the various embodiments and with various modifications as are suited to the particular use contemplated. All such modifications and variations are within the scope of the disclosure as determined by the claims, and all equivalents thereof, when interpreted in accordance with the breadth to which they are fairly, legally, and equitably entitled.

What is claimed:

1. A power oscillation damping system for an electric power grid, comprising:
   a power electronic device configured to generate active power or reactive power, or regulate the electric power grid; and
   a controller configured to selectively pass and damp oscillations of one or more input signals from the electric power grid, the controller being coupled to memory and being configured to:
      generate a power oscillation damper (POD) control signal based on the one or more input signals;
      determine a dynamic gain based on an amplitude of the oscillations, a duration of the oscillations, and a rate of damping of the oscillations in the one or more input signals;
      apply the dynamic gain to the POD control signal to modify the amplitude of the POD control signal;
      input the POD control signal having the dynamic gain into an output signal limiter having dynamic limits that are openable and closeable, the dynamic limits defining a maximum output of the controller;
      count, via a counter, each pulse in the POD control signal with respect to time, the pulse being a rising edge of the POD control signal that deviates in a positive direction or a negative direction from zero;
      selectively open and close the dynamic limits of the output signal limiter based on a pulse count with respect to time; and
      output the POD control signal in response to the output signal limiter being opened,
      reset the counter in response to no pulses being detected within a first predetermined period of time,
      reset the first predetermined period of time in response to a pulse being detected,
      close the dynamic limits of the output signal limiter in response to the pulse count reaching a maximum pulse count within a second predetermined period of time,
      close the dynamic limits of the output signal limiter in response to the pulse count being incremented within the first predetermined period of time of the second predetermined period of time elapsing,
      open the dynamic limits of the output signal limiter in response to the maximum pulse count not being exceeded within the second predetermined period of time and the pulse count not being incremented within first predetermined period of time of the second predetermined period of time elapsing, and
      limit the POD control signal by the dynamic limits of the output signal limiter.

2. The power oscillation damping system according to claim 1, wherein the controller is further configured to
   determine whether a magnitude of oscillation in the one or more input signals is above or below an oscillation magnitude threshold,
   pass input signals having oscillations that are below the oscillation magnitude threshold unmodified to allow self-damping, and
   modify input signals having oscillations that are above the oscillation magnitude threshold with the dynamic gain.

3. The power oscillation damping system according to claim 1, wherein
   the controller is further configured to include a linear control path having a pulse counter logic circuit, and
   the pulse counter logic circuit includes:
      one or more logic gates;
      an impulse detector configured to output a first logic output signal indicating a rising edge in the positive direction or the negative direction of the POD control signal;
      an initial pulse detector configured to output a second logic output signal indicating a first increment of the counter;
      an edge detector configured to output a third logic output signal for a predetermined period of time, the third logic output signal indicating a change in an input of the edge detector;
      a delay configured to output a fourth logic output signal after a predetermined waiting period of time, the fourth logic output signal indicating a sustained change in an input of the delay;
      a dynamic limiter setter configured to open and set the dynamic limits of the output signal limiter; and
      a maximum pulse detector configured to output a fifth logic output signal indicating that the counter has reached a predetermined maximum number of pulses.

4. The power oscillation damping system according to claim 1, wherein the controller is further configured to scale the POD control signal before determining the dynamic gain by amplifying higher magnitude variations in the POD control signal and reducing lower magnitude variations in the POD control signal.

5. A power oscillation damping system for an electric power grid, comprising:
   a power electronic device configured to generate active power or reactive power, or regulate the electric power grid; and
   a controller configured to selectively pass and damp oscillations of one or more input signals from the electric power grid, the controller being coupled to memory and being configured to:
      generate a power oscillation damper (POD) control signal based on the one or more input signals;

determine a dynamic gain based on an amplitude of the oscillations, a duration of the oscillations, and a rate of damping of the oscillations in the one or more input signals;
apply the dynamic gain to the POD control signal to modify the amplitude of the POD control signal;
input the POD control signal having the dynamic gain into an output signal limiter having dynamic limits that are openable and closeable, the dynamic limits defining a maximum output of the controller;
count, via a counter, each pulse in the POD control signal with respect to time, the pulse being a rising edge of the POD control signal that deviates in a positive direction or a negative direction from zero;
selectively open and close the dynamic limits of the output signal limiter based on a pulse count with respect to time; and
output the POD control signal in response to the output signal limiter being opened,
wherein the controller is further configured to determine the dynamic gain based on the one or more input signals by:
taking an absolute value of the POD control signal having a DC-offset removed;
applying an integrator with unity feedback to the absolute value of the POD control signal;
determining a rate of change in the POD control signal after the integrator, which represents a rate of damping of the oscillations;
limiting the POD control signal by a dynamic limiter, which has dynamic limits that are openable and closeable, the dynamic limits of the dynamic limiter defining a maximum damping rate and a minimum damping rate of oscillation range to be acted upon;
determining a dynamic gain scaling factor based on a limited damping rate of the oscillations; and
applying the dynamic gain scaling factor to the POD control signal as the dynamic gain.

6. The power oscillation damping system according to claim 1, wherein
the one or more input signals includes a first input signal and a second input signal, and
the controller is further configured to
generate a first POD control branch signal for the first input signal and a second POD control branch signal for the second input signal, and
apply a first dynamic gain to the first POD control branch signal,
apply a second dynamic gain to the second POD control branch signal, and
combine the first POD control branch signal and the second POD control branch signal having the first dynamic gain and the second dynamic gain via a summer to form the POD control signal.

7. A computer-implemented method to selectively pass and damp oscillations in an electric power grid via a power electronic device, comprising:
generating, via a controller, a power oscillation damper (POD) control signal based on one or more input signals from the electric power grid;
determining a dynamic gain based on an amplitude of the oscillations, a duration of the oscillations, and a rate of damping of the oscillations in the one or more input signals;
applying the dynamic gain to the POD control signal to modify the amplitude of the POD control signal;
inputting the POD control signal having the dynamic gain into an output signal limiter having dynamic limits that are openable and closeable, wherein the dynamic limits define a maximum output of the controller;
counting, via a counter, each pulse in the POD control signal with respect to time, wherein the pulse is a rising edge of the POD control signal that deviates in a positive direction or a negative direction from zero;
selectively opening and closing the dynamic limits of the output signal limiter based on a pulse count with respect to time;
outputting the POD control signal in response to the output signal limiter being opened,
resetting the counter in response to no pulses being detected within a first predetermined period of time,
resetting the first predetermined period of time in response to a pulse being detected,
closing the dynamic limits of the output signal limiter in response to the pulse count reaching a maximum pulse count within a second predetermined period of time,
closing the dynamic limits of the output signal limiter in response to the pulse count being incremented within the first predetermined period of time of the second predetermined period of time elapsing,
opening the dynamic limits of the output signal limiter in response to the maximum pulse count not being exceeded within the second predetermined period of time and the pulse count not being incremented within first predetermined period of time of the second predetermined period of time elapsing, and
limiting the POD control signal by the dynamic limits of the output signal limiter.

8. The computer-implemented method according to claim 7, further comprising
determining whether a magnitude of oscillation in the one or more input signals is above or below an oscillation magnitude threshold,
passing input signals having oscillations that are below the oscillation magnitude threshold unmodified to allow self-damping, and
modifying input signals having oscillations that are above the oscillation magnitude threshold with the dynamic gain.

9. The computer-implemented method according to claim 7, wherein
the controller is further configured to include a linear control path having a pulse counter logic circuit, and
the pulse counter logic circuit includes:
one or more logic gates;
an impulse detector configured to output a first logic output signal that indicates a rising edge in the positive direction or the negative direction of the POD control signal;
an initial pulse detector configured to output a second logic output signal that indicates a first increment of the counter;
an edge detector configured to output a third logic output signal for a predetermined period of time, wherein the third logic output signal indicates a change in an input of the edge detector;
a delay configured to output a fourth logic output signal after a predetermined waiting period of time, wherein the fourth logic output signal indicates a sustained change in an input of the delay;
a dynamic limiter setter configured to open and set the dynamic limits of the output signal limiter; and a maximum pulse detector configured to output a fifth logic output signal that indicates that the counter has reached a predetermined maximum number of pulses.

10. The computer-implemented method according to claim 7, further comprising
scaling the POD control signal before the determining of the dynamic gain by amplifying higher magnitude variations in the POD control signal and reducing lower magnitude variations in the POD control signal.

11. A computer-implemented method to selectively pass and damp oscillations in an electric power grid via a power electronic device, comprising:
generating, via a controller, a power oscillation damper (POD) control signal based on one or more input signals from the electric power grid;
determining a dynamic gain based on an amplitude of the oscillations, a duration of the oscillations, and a rate of damping of the oscillations in the one or more input signals;
applying the dynamic gain to the POD control signal to modify the amplitude of the POD control signal;
inputting the POD control signal having the dynamic gain into an output signal limiter having dynamic limits that are openable and closeable, wherein the dynamic limits define a maximum output of the controller;
counting, via a counter, each pulse in the POD control signal with respect to time, wherein the pulse is a rising edge of the POD control signal that deviates in a positive direction or a negative direction from zero;
selectively opening and closing the dynamic limits of the output signal limiter based on a pulse count with respect to time; and
outputting the POD control signal in response to the output signal limiter being opened,
wherein the determining of the dynamic gain based on the one or more input signals further comprises:
taking an absolute value of the POD control signal having a DC-offset removed;
applying an integrator with unity feedback to the absolute value of the POD control signal;
determining a rate of change in the POD control signal after the integrator, which represents a rate of damping of the oscillations;
limiting the POD control signal by a dynamic limiter, which has dynamic limits that are openable and closeable, the dynamic limits of the dynamic limiter defining a maximum damping rate and a minimum damping rate of oscillation range to be acted upon;
determining a dynamic gain scaling factor based on a limited damping rate of the oscillations; and
applying the dynamic gain scaling factor to the POD control signal as the dynamic gain.

12. The computer-implemented method according to claim 7, wherein
the one or more input signals includes a first input signal and a second input signal, and
wherein the computer-implemented method further comprises:
generating a first POD control branch signal for the first input signal and a second POD control branch signal for the second input signal, and
applying a first dynamic gain to the first POD control branch signal,
applying a second dynamic gain to the second POD control branch signal, and
combining the first POD control branch signal and the second POD control branch signal having the first dynamic gain and the second dynamic gain via a summer to form the POD control signal.

13. A non-transitory computer readable medium comprising executable instructions for performing a computer-implemented method to selectively pass and damp oscillations of an electric power grid via a power electronic device, comprising:
generating, via a controller, a power oscillation damper (POD) control signal based on one or more input signals from the electric power grid;
determining a dynamic gain based on an amplitude of the oscillations, a duration of the oscillations, and a rate of damping of the oscillations in the one or more input signals;
applying the dynamic gain to the POD control signal to modify the amplitude of the POD control signal;
inputting the POD control signal having the dynamic gain into an output signal limiter having dynamic limits that are openable and closeable, wherein the dynamic limits define a maximum output of the controller;
counting, via a counter, each pulse in the POD control signal with respect to time, wherein the pulse is a rising edge of the POD control signal that deviates in a positive direction or a negative direction from zero;
selectively opening and closing the dynamic limits of the output signal limiter based on a pulse count with respect to time;
outputting the POD control signal in response to the output signal limiter being opened,
resetting the counter in response to no pulses being detected within a first predetermined period of time,
resetting the first predetermined period of time in response to a pulse being detected,
closing the dynamic limits of the output signal limiter in response to the pulse count reaching a maximum pulse count within a second predetermined period of time,
closing the dynamic limits of the output signal limiter in response to the pulse count being incremented within the first predetermined period of time of the second predetermined period of time elapsing,
opening the dynamic limits of the output signal limiter in response to the maximum pulse count not being exceeded within the second predetermined period of time and the pulse count not being incremented within first predetermined period of time of the second predetermined period of time elapsing, and
limiting the POD control signal by the dynamic limits of the output signal limiter.

14. The non-transitory computer readable medium of claim 13, wherein
the controller is further configured to include a linear control path having a pulse counter logic circuit, and
the pulse counter logic circuit includes:
one or more logic gates;
an impulse detector configured to output a first logic output signal that indicates a rising edge in the positive direction or the negative direction of the POD control signal;
an initial pulse detector configured to output a second logic output signal that indicates a first increment of the counter;
an edge detector configured to output a third logic output signal for a predetermined period of time, wherein the third logic output signal indicates a change in an input of the edge detector;

a delay configured to output a fourth logic output signal after a predetermined waiting period of time, wherein the fourth logic output signal indicates a sustained change in an input of the delay;

a dynamic limiter setter configured to open and set the dynamic limits of the output signal limiter; and a maximum pulse detector configured to output a fifth logic output signal that indicates that the counter has reached a predetermined maximum number of pulses.

15. The power oscillation damping system according to claim 5, wherein the controller is further configured to determine whether a magnitude of oscillation in the one or more input signals is above or below an oscillation magnitude threshold, pass input signals having oscillations that are below the oscillation magnitude threshold unmodified to allow self-damping, and modify input signals having oscillations that are above the oscillation magnitude threshold with the dynamic gain.

16. The power oscillation damping system according to claim 5, wherein the controller is further configured to scale the POD control signal before determining the dynamic gain by amplifying higher magnitude variations in the POD control signal and reducing lower magnitude variations in the POD control signal.

17. The power oscillation damping system according to claim 5, wherein the one or more input signals includes a first input signal and a second input signal, and the controller is further configured to generate a first POD control branch signal for the first input signal and a second POD control branch signal for the second input signal, and apply a first dynamic gain to the first POD control branch signal, apply a second dynamic gain to the second POD control branch signal, and combine the first POD control branch signal and the second POD control branch signal having the first dynamic gain and the second dynamic gain via a summer to form the POD control signal.

18. The computer-implemented method according to claim 11, further comprising determining whether a magnitude of oscillation in the one or more input signals is above or below an oscillation magnitude threshold, passing input signals having oscillations that are below the oscillation magnitude threshold unmodified to allow self-damping, and modifying input signals having oscillations that are above the oscillation magnitude threshold with the dynamic gain.

19. The computer-implemented method according to claim 11, further comprising scaling the POD control signal before the determining of the dynamic gain by amplifying higher magnitude variations in the POD control signal and reducing lower magnitude variations in the POD control signal.

20. The computer-implemented method according to claim 11, wherein the one or more input signals includes a first input signal and a second input signal, and wherein the computer-implemented method further comprises:

generating a first POD control branch signal for the first input signal and a second POD control branch signal for the second input signal, and applying a first dynamic gain to the first POD control branch signal, applying a second dynamic gain to the second POD control branch signal, and combining the first POD control branch signal and the second POD control branch signal having the first dynamic gain and the second dynamic gain via a summer to form the POD control signal.

21. A non-transitory computer readable medium comprising executable instructions for performing a computer-implemented method to selectively pass and damp oscillations of an electric power grid via a power electronic device, comprising:

generating, via a controller, a power oscillation damper (POD) control signal based on one or more input signals from the electric power grid;

determining a dynamic gain based on an amplitude of the oscillations, a duration of the oscillations, and a rate of damping of the oscillations in the one or more input signals;

applying the dynamic gain to the POD control signal to modify the amplitude of the POD control signal;

inputting the POD control signal having the dynamic gain into an output signal limiter having dynamic limits that are openable and closeable, wherein the dynamic limits define a maximum output of the controller;

counting, via a counter, each pulse in the POD control signal with respect to time, wherein the pulse is a rising edge of the POD control signal that deviates in a positive direction or a negative direction from zero;

selectively opening and closing the dynamic limits of the output signal limiter based on a pulse count with respect to time; and outputting the POD control signal in response to the output signal limiter being opened, wherein the determining of the dynamic gain based on the one or more input signals further comprises:

taking an absolute value of the POD control signal having a DC-offset removed;

applying an integrator with unity feedback to the absolute value of the POD control signal;

determining a rate of change in the POD control signal after the integrator, which represents a rate of damping of the oscillations;

limiting the POD control signal by a dynamic limiter, which has dynamic limits that are openable and closeable, the dynamic limits of the dynamic limiter defining a maximum damping rate and a minimum damping rate of oscillation range to be acted upon;

determining a dynamic gain scaling factor based on a limited damping rate of the oscillations; and applying the dynamic gain scaling factor to the POD control signal as the dynamic gain.

* * * * *